United States Patent
Berenberg

(10) Patent No.: US 9,883,230 B1
(45) Date of Patent: Jan. 30, 2018

(54) SELF-ORGANIZED TIME-SYNCHRONIZATION NETWORK

(71) Applicant: Amazon Technologies, Inc., Seattle, WA (US)

(72) Inventor: Paul Berenberg, Los Altos, CA (US)

(73) Assignee: Amazon Technologies, Inc., Seattle, WA (US)

(\*) Notice: Subject to any disclaimer, the term of this patent is extended or adjusted under 35 U.S.C. 154(b) by 0 days.

(21) Appl. No.: 14/863,557

(22) Filed: Sep. 24, 2015

(51) Int. Cl.
| | |
|---|---|
| H04N 5/931 | (2006.01) |
| H04N 21/43 | (2011.01) |
| H04W 56/00 | (2009.01) |
| H04N 21/4223 | (2011.01) |
| H04N 21/45 | (2011.01) |
| H04W 84/18 | (2009.01) |

(52) U.S. Cl.
CPC ..... H04N 21/4307 (2013.01); H04N 21/4223 (2013.01); H04N 21/4524 (2013.01); H04W 56/001 (2013.01); H04W 56/0045 (2013.01); H04W 84/18 (2013.01)

(58) Field of Classification Search
CPC .......... H04N 9/896; H04N 5/932; H04N 5/95; G11B 2220/90; G11B 27/10
USPC ........................................... 386/207; 370/350
See application file for complete search history.

(56) References Cited

U.S. PATENT DOCUMENTS

| | | | | |
|---|---|---|---|---|
| 2008/0240073 | A1* | 10/2008 | Pun | H04W 56/0015 370/350 |
| 2010/0202436 | A1* | 8/2010 | Albert | H04J 3/0655 370/350 |
| 2011/0106970 | A1* | 5/2011 | Song | H04L 65/4015 709/236 |
| 2012/0063447 | A1* | 3/2012 | Tyrrell | H04W 56/00 370/350 |
| 2014/0206296 | A1* | 7/2014 | Chakraborty | H04B 1/0458 455/77 |
| 2016/0094945 | A1* | 3/2016 | Kulkarni | H04W 4/023 709/224 |

\* cited by examiner

*Primary Examiner* — William Tran
(74) *Attorney, Agent, or Firm* — Pierce Atwood LLP

(57) ABSTRACT

Devices, systems and methods are disclosed for creating a self-organized time-synchronization network, enabling accurate synchronization. For example, multiple devices may wirelessly broadcast and receive beacon signals and self-organize into an ad hoc network. The wireless ad hoc network may be optimized as individual devices choose new connections to reduce a number of hops to a source device. Individual devices may include a counter that may increment continuously for timing purposes, and counters may be synchronized between connected devices. For example, a local device may adjust contents of a local counter on the local device based on a drift between the local counter and a remote counter on a remote device. Thus, counters between connected devices may be synchronized, beginning at the source device and propagating through the ad hoc network. Based on the synchronization, the devices may offer additional functionality and/or more sophisticated applications.

22 Claims, 20 Drawing Sheets

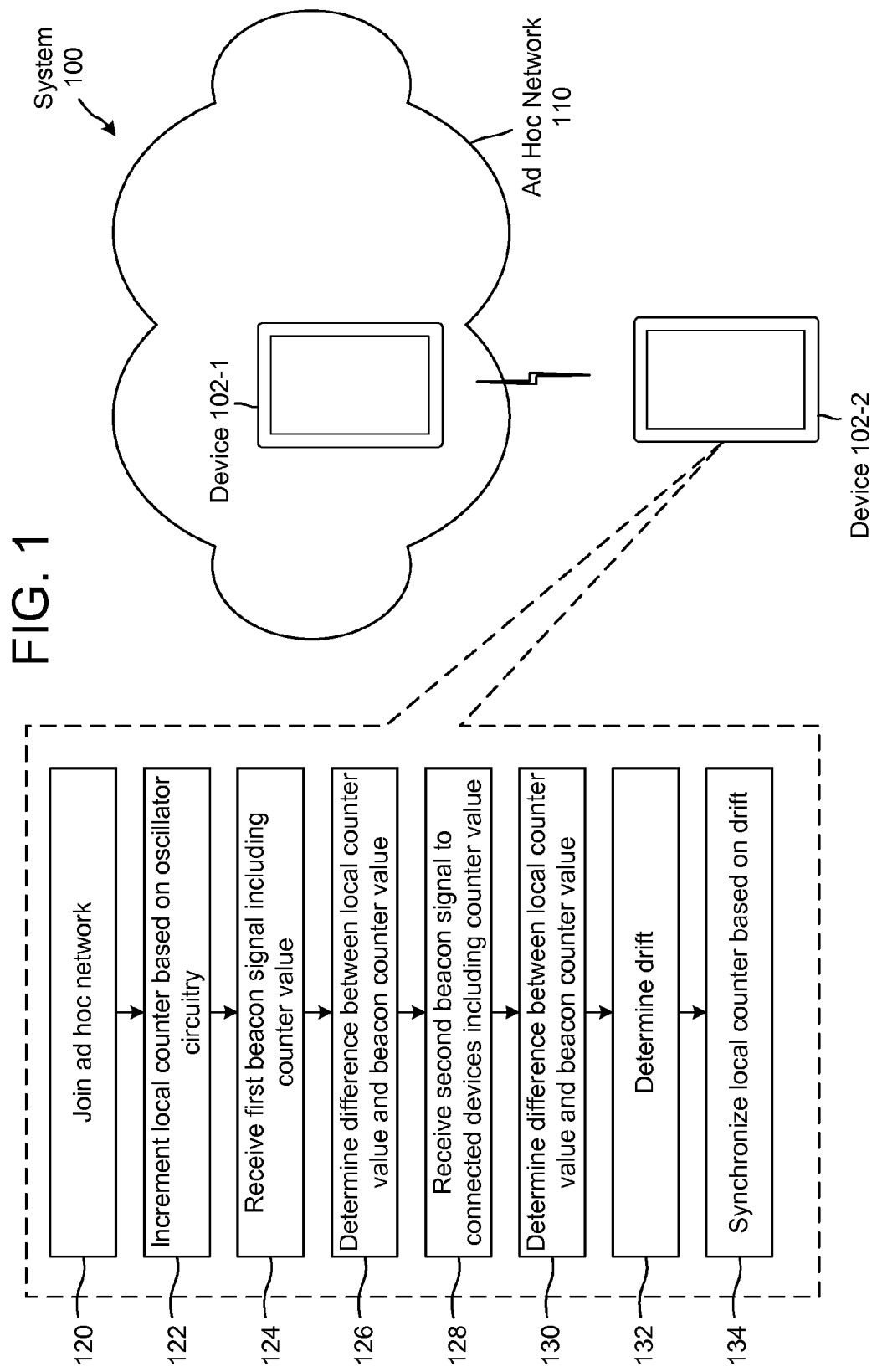

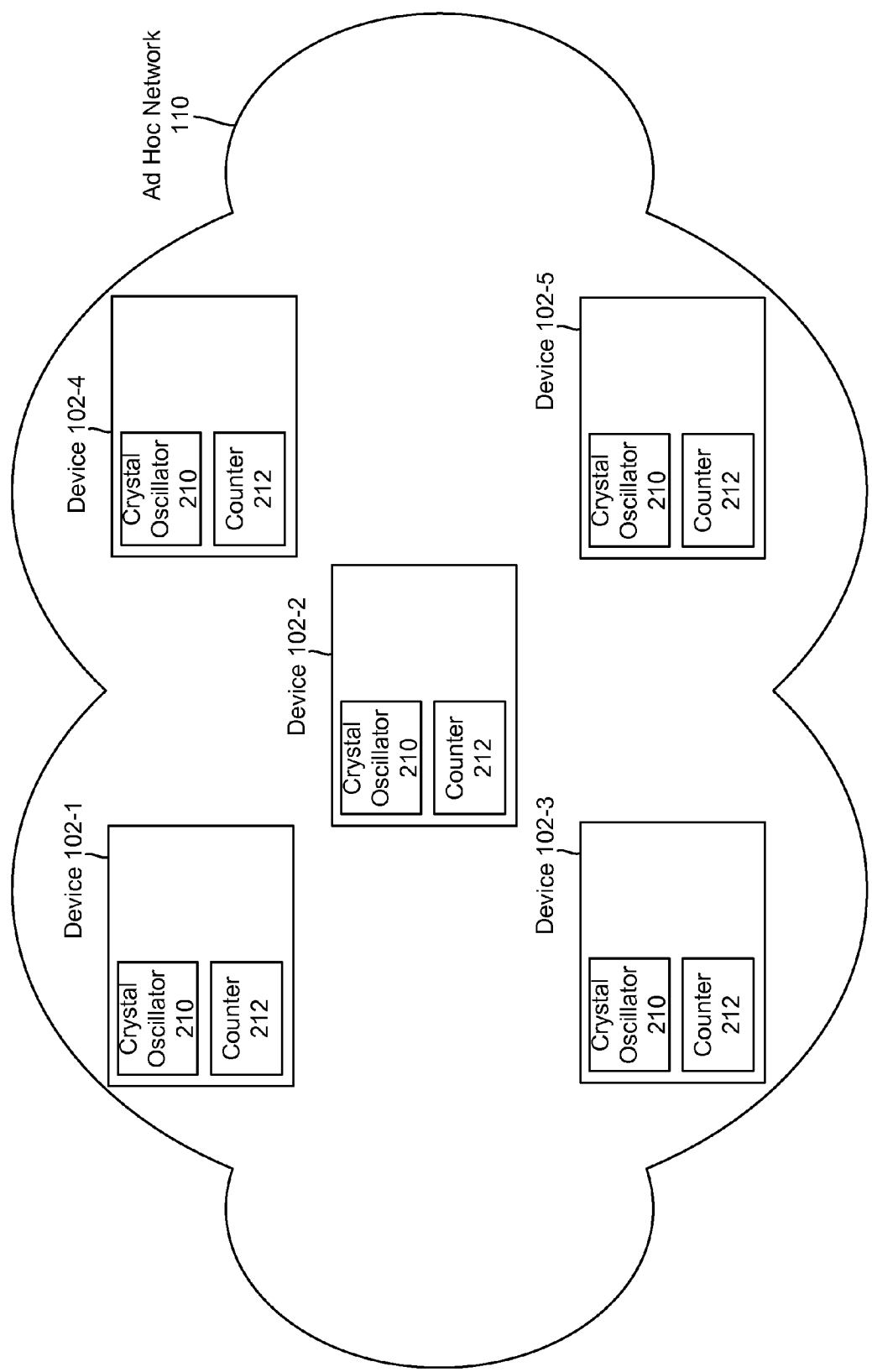

FIG. 2B

| DID (Device Identification) | SID (Source Identification) | TC (Tick Counter) | SC (Source Cost) |
|---|---|---|---|
| 8 bytes | 8 bytes | 3 bytes | 1 byte |
| [0-7] | [8-15] | [16-18] | [19] |

Beacon Signal 220

Total
20 bytes
[0-19]

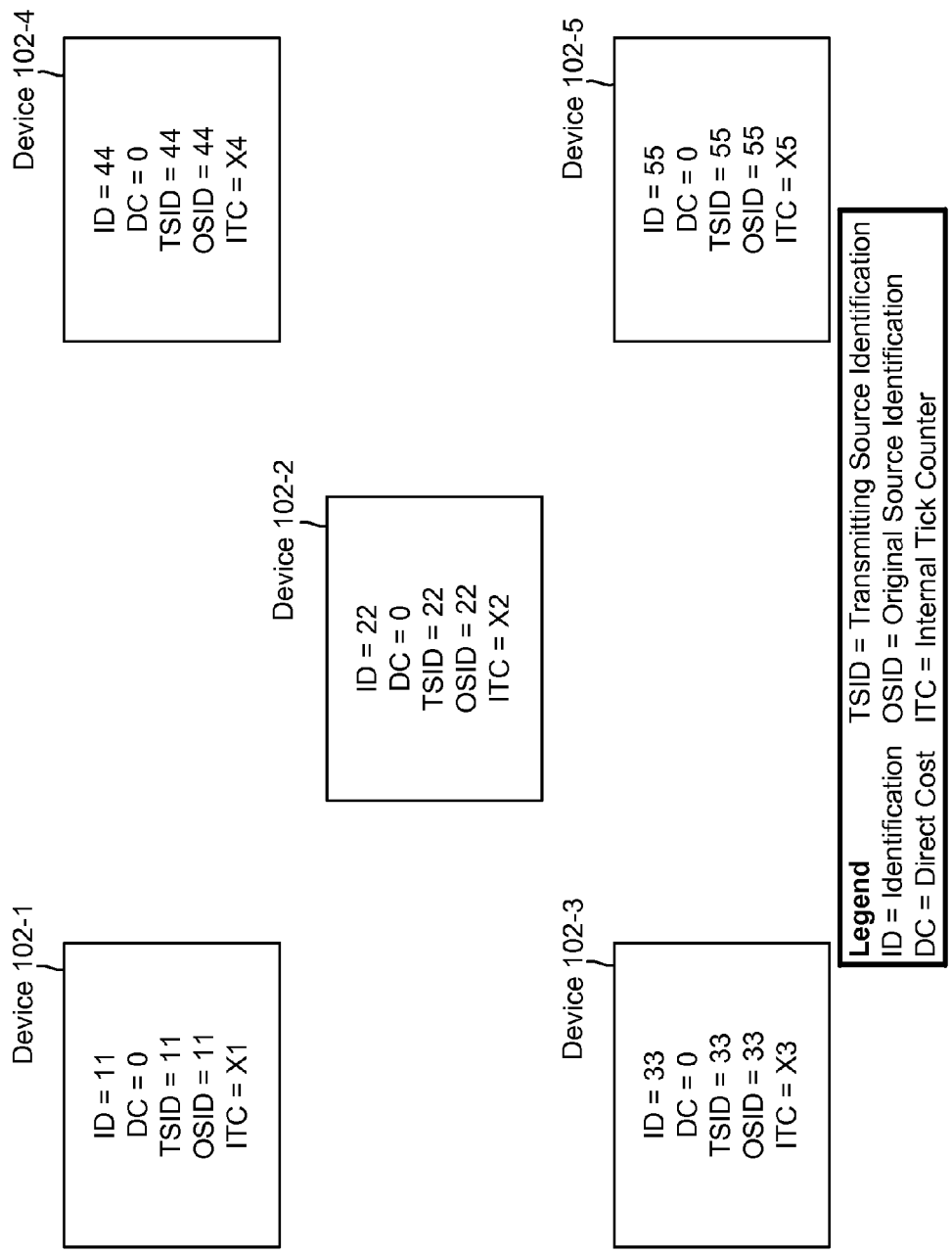

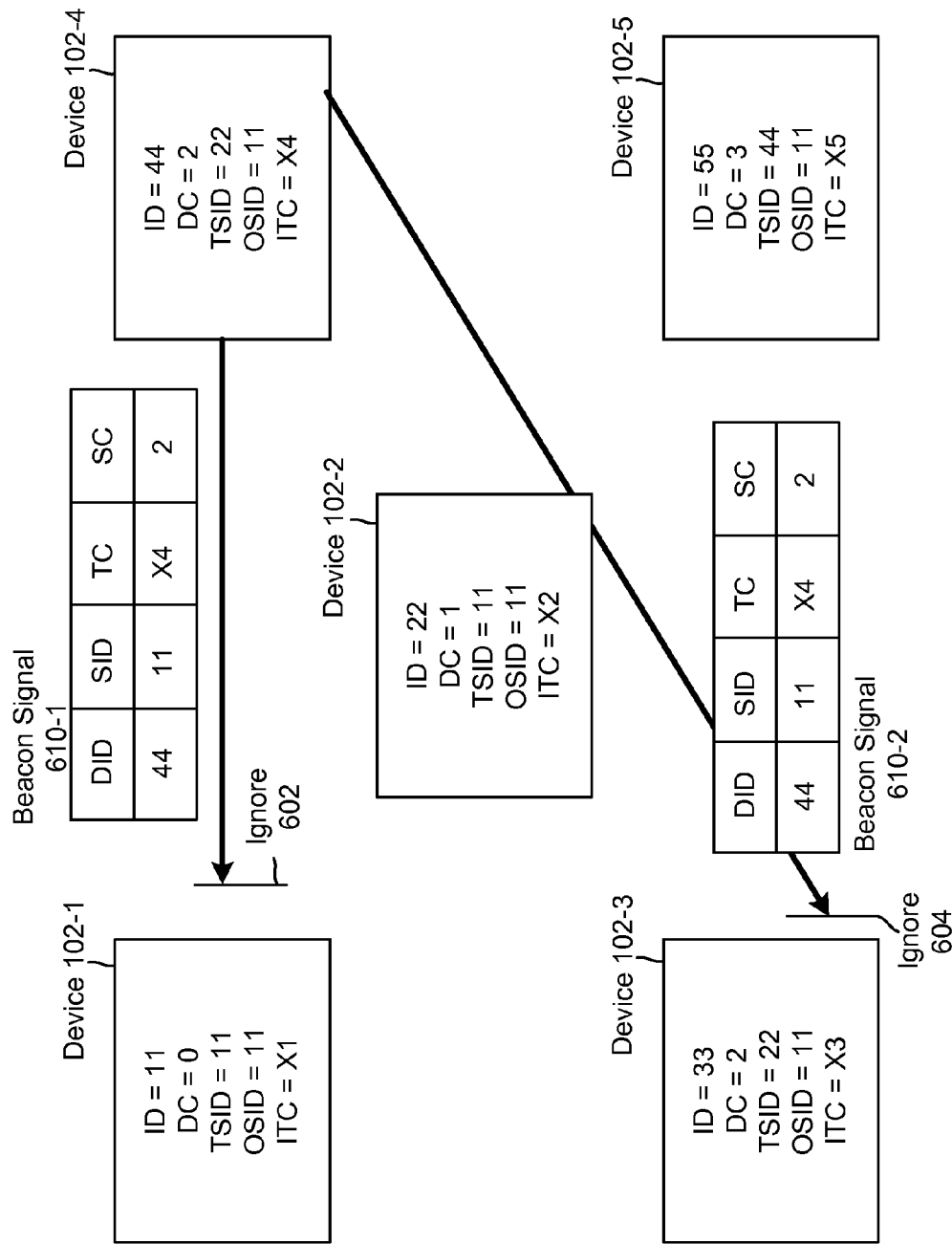

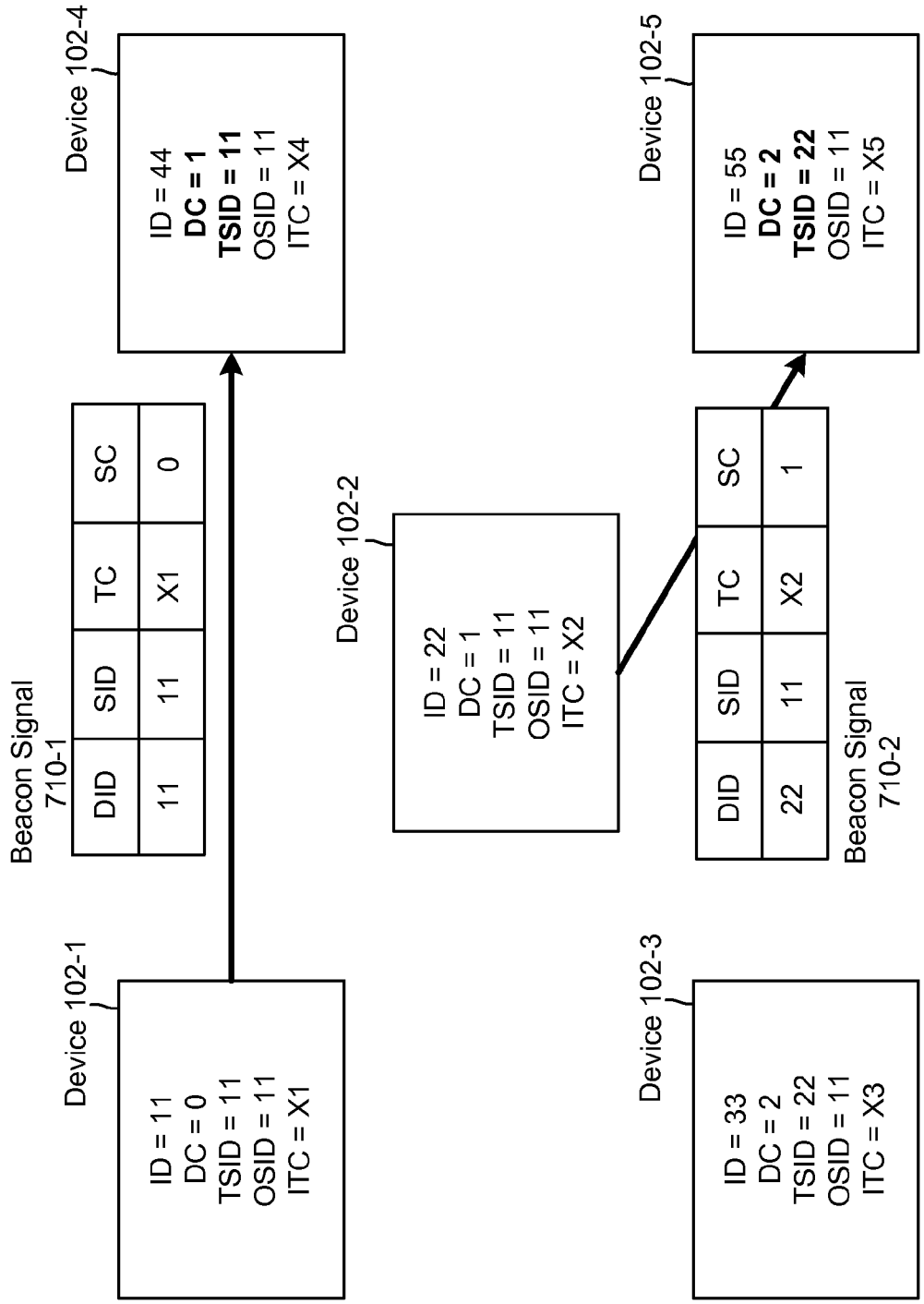

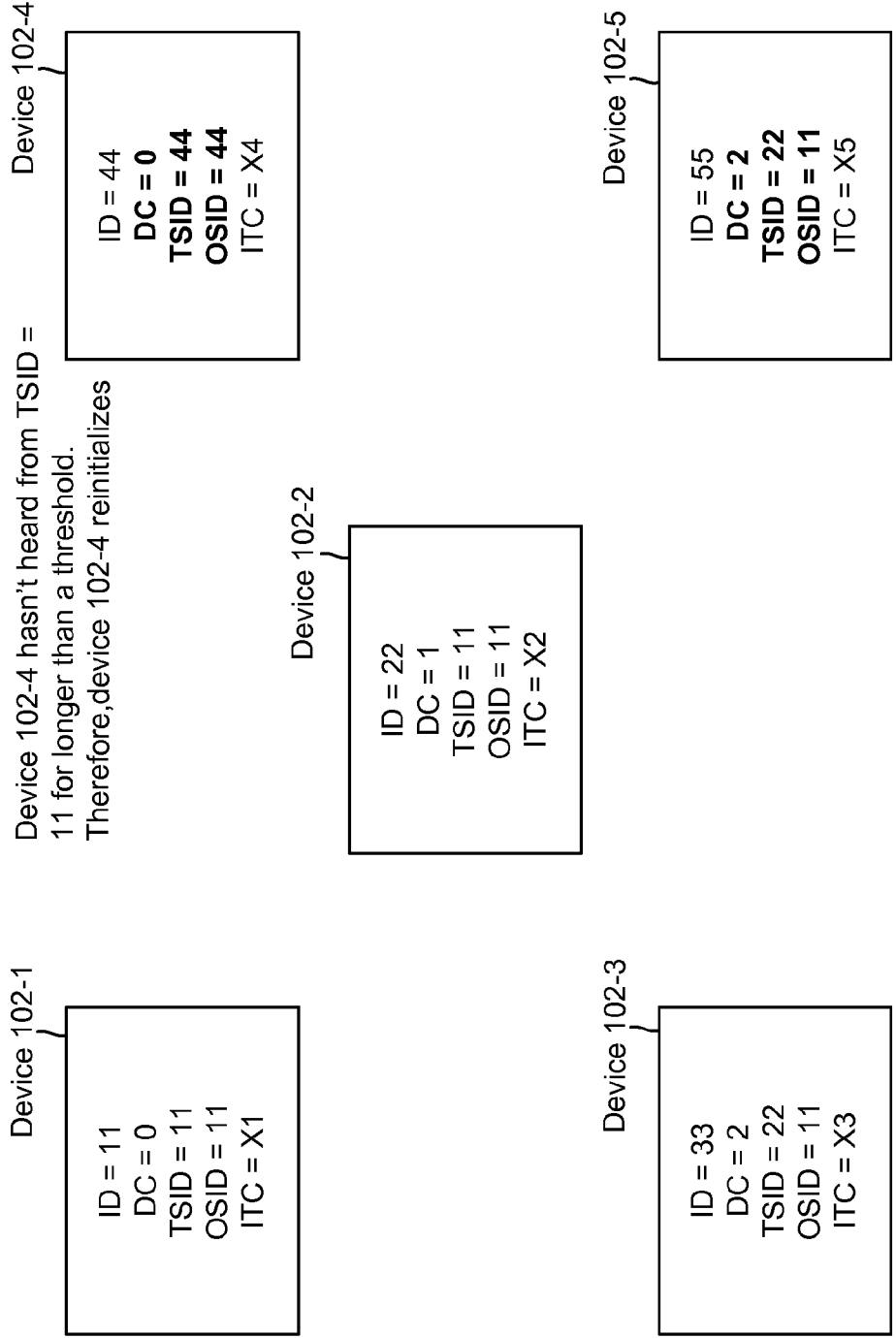

SELF-ORGANIZED TIME-SYNCHRONIZATION NETWORK

BACKGROUND

With the advancement of technology, the use and popularity of electronic devices has increased considerably. Multiple electronic devices are commonly used together.

BRIEF DESCRIPTION OF DRAWINGS

For a more complete understanding of the present disclosure, reference is now made to the following description taken in conjunction with the accompanying drawings.

FIG. 1 illustrates an overview of a system for synchronizing multiple devices according to embodiments of the present disclosure.

FIG. 2A-2B illustrate an example of an ad hoc network including multiple devices and an example of a beacon signal according to embodiments of the present disclosure.

FIGS. 3A-3B illustrate examples of initializing an ad hoc network according to embodiments of the present disclosure.

FIG. 6 illustrates an example of preventing loops in the ad hoc network according to embodiments of the present disclosure.

FIG. 7 illustrates an example of optimizing an ad hoc network according to embodiments of the present disclosure.

FIGS. 8A-8B illustrate examples of timeout and re-initialization according to embodiments of the present disclosure.

DETAILED DESCRIPTION

Figure 3B:
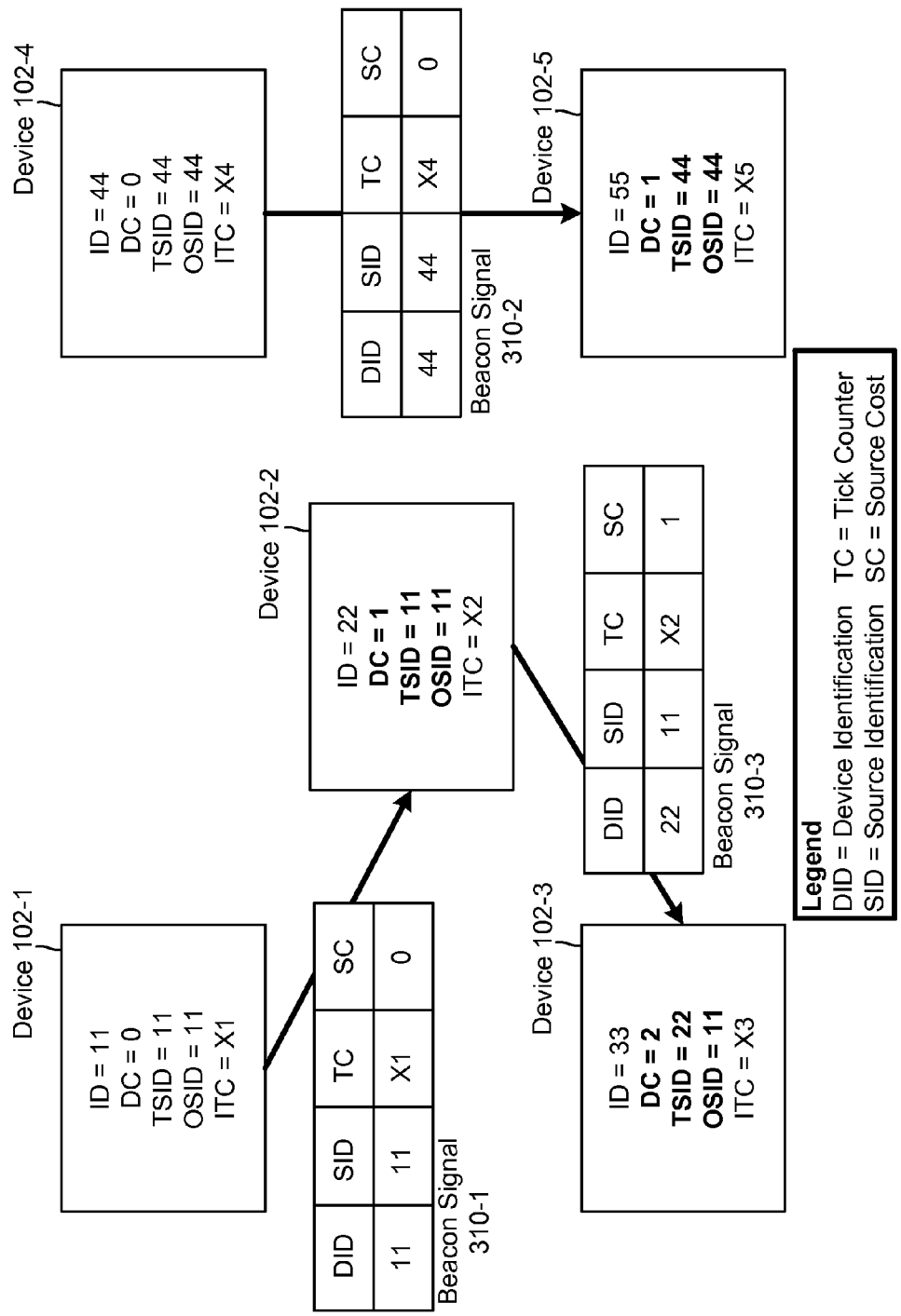

Multiple electronic devices may be synchronized to enable additional functionality and more sophisticated applications. For example, devices may be synchronized to accurately reproduce sounds using multiple speakers/devices, including surround sound or multi-room playback. As another example, devices may be synchronized to accurately stitch image data and/or video data captured by separate cameras/devices or combine audio data captured by separate microphones/devices. In some examples, display devices may be synchronized to display images at the same time on multiple displays/devices. However, accurately synchronizing multiple devices may require established connections and may significantly increase processor load, power consumption or the like.

To enable accurate synchronization without significantly increasing processor load, power consumption or the like, devices, systems and methods are disclosed that create a self-organized time-synchronization network. For example, multiple devices may wirelessly broadcast and receive beacon signals and self-organize into a time synchronization ad hoc network. The wireless ad hoc network may be optimized as individual devices choose new connections to reduce a number of hops to a source device. Individual devices may include a counter that may increment based on oscillator circuitry, which may include an oscillator crystal, and counters may be synchronized between connected devices. For example, a local device may adjust contents of a local counter on the local device based on a drift between the local counter and a remote counter on a remote device. Thus, counters between connected devices may be synchronized, beginning at the source device and propagating through the ad hoc network. Based on the synchronization, the devices may offer additional functionality and/or more sophisticated applications.

FIG. 1 illustrates an overview of a system 100 for implementing embodiments of the disclosure. The system 100 includes a first device 102-1 included in an ad hoc network 110 and a second device 102-2 joining the ad hoc network 110 via the first device 102-1. For ease of explanation, FIG. 1 focuses on the second device 102-2 connecting to the first device 102-1 to create/join the ad hoc network 110, although the present disclosure is not limited thereto. The flowchart illustrated in FIG. 1 may be executed by the first device 102-1 and/or additional devices 102 without departing from the present disclosure. While not illustrated in FIG. 1, the first device 102-1 and/or the second device 102-2 may be connected to additional devices 102. In this example, the first device 102-1 is either a source device or is closer to the source device than the second device 102-2, although the connections (e.g., links between two nodes, such as the second device 102-2 receiving a beacon signal transmitted by the first device 102-1) within the ad hoc network 110 may change over time.

As illustrated in FIG. 1, the second device 102-2 may join (120) the ad hoc network 110 by wirelessly connecting to the first device 110-1. For example, as will be discussed in greater detail below, the first device 102-1 may transmit a beacon signal to the second device 102-2 and the second device 102-2 may connect to the first device 102-1 based on the beacon signal. The beacon signal may include beacon information, such as device identification (DID) associated with the first device 102-1, source identification (SID) associated with a source device (e.g., a beginning of the ad hoc network 110), contents of a remote counter (e.g., a tick circular counter (TC) on the first device 102-1) and/or a source cost (SC) indicating a number of hops from the first device 102-1 to the source device (e.g., a number of connections/links in a first path between the first device 102-1 and the source device). Examples of beacon signals may include Bluetooth® Low Energy (BLE) or Bluetooth® Smart advertising signals.

The ad hoc network 110 may be a time synchronization ad hoc network configured to synchronize clocks/timers/counters amongst various devices in the ad hoc network 110. Thus, the ad hoc network 110 may be generated using beacon signals for the sole purpose of time synchronization, enabling multiple devices to synchronize clocks/timers/counters without configuration or user intervention. For example, the ad hoc network 110 may synchronize counters used by two or more cameras, such that image/video data captured by the two or more cameras are synchronized and include the synchronized time information. Using the synchronized time information, the image/video data may be stitched together with greater precision relative to unsynchronized image/video data. Similarly, the ad hoc network 110 may synchronize two or more speakers (e.g., standalone speakers with Bluetooth® connectivity or the like), for example in a surround sound speaker system (e.g., 5.1 surround sound, 7.1 surround sound or the like), multi-room speaker system, multi-speaker concert or the like, such that each of the two or more speakers includes the synchronized time information. Using the synchronized time information (e.g., local counter), an individual speaker may determine a timing associated with audio playback, enabling the two or more speakers to playback audio with greater precision.

The second device 102-2 may increment (122) a local counter on the second device 102-2 based on oscillator circuitry. For example, the oscillator circuitry may include a crystal oscillator or other circuitry to generate electrical signals at a fixed frequency. In some examples, the fixed frequency may be around 32 kHz, such as a frequency of 32.768 kHz, which corresponds to half of a 16 bit counter. In some examples, the crystal oscillator may be an inexpensive 32 kHz crystal oscillator with manufacturing deviation of +/−20 parts per million (PPM). Typical aging of the crystal oscillator may be less than 5 PPM per year, and the crystal oscillator may have a temperature related deviation of +/−40 PPM in the temperature range from −20° C. to +60° C. Due to variations between individual oscillator crystals (e.g., age, temperature or the like), a drift may occur when a local counter deviates from a remote counter by a number of increments (e.g., ticks or PPM). In a stable environment, the drift may remain relatively constant over time (e.g., +/−1 tick over a fixed duration of time), although variations in temperatures and devices may affect the drift and the drift may vary without departing from the present disclosure. Using the synchronization technique discussed in greater detail below, the system 100 may account for this drift and maintain accurate synchronization despite the variations in frequency between individual oscillator crystals. The counter may include a dedicated timer (e.g., at least a 24 bit timer) to track the electrical signals (e.g., crystal ticks when using the oscillator crystal) and may increment continuously based on the oscillator circuitry. However, the present disclosure is not limited thereto and the fixed frequency may vary or the oscillator circuitry may generate a variable frequency without departing from the present disclosure. For example, if the oscillator circuitry generates a variable frequency, the frequency may fluctuate over time but the second device 102-2 may remain synchronized with the first device 102-1 with a high degree of accuracy/precision.

The second device 102-2 may receive (124) a first beacon signal including contents of the remote counter (e.g., a tick circular counter (TC)) on the first device 102-1 at a first time. As discussed above, the first beacon signal may include additional information (e.g., DID, SID, SC, etc.) used for maintaining and optimizing the ad hoc network 110. The second device 102-2 may determine (126) a first difference between a first local counter value (e.g., contents of the local counter at the first time) and the first beacon counter value (e.g., contents of the remote counter at the first time). The second device 102-2 may receive (128) a second beacon signal including contents of the remote counter at a second time. The second device 102-2 may determine (130) a second difference between a second local counter value (e.g., contents of the local counter at the second time) and the second beacon counter value (e.g., contents of the remote counter at the second time).

The second device 102-2 may determine (132) drift based on the first difference and the second difference. For example, the local counter may have an initial value of 100 at the first time and a final value of 400 at the second time, whereas the remote counter may have an initial value of 600 at the first time and a final value of 906 at the second time. Thus, the second device 102-2 may determine that the first difference is equal to 500 (e.g., $\Delta_1$=600-100), the second difference is equal to 506 (e.g., $\Delta_2$=906-400) and the resulting drift is equal to 6 (e.g., drift=506-500). However, this is one technique for determining the drift and the present disclosure is not limited thereto. Instead, as will be discussed in greater detail below, the second device 102-2 may determine the drift based on differences between the initial values and the final values of the local counter (e.g., 400-100=300) and the remote counter (e.g., 906-600=306) without departing from the disclosure.

After determining the drift, the second device 102-2 may synchronize (134) the local counter based on the drift. For example, the second device 102-2 may adjust (e.g., modify, increment or the like) the local counter by the drift. Using the above example, if the final value of the local counter is 400 at the second time, the second device 102-2 may adjust the local counter by 6 so that a synchronized value of the local counter is 406. Thus, the second device 102-2 may determine that the remote counter incremented 6 times more than the local counter and adjust the local counter accordingly. Therefore, adjustments to counters in the source device and/or any intervening devices may be determined and the local counter adjusted to automatically synchronize the local counter to the source counter in the source device.

While not illustrated in FIG. 1, the second device 102-2 may determine a duration associated with the drift. For example, the second device 102-2 may determine a period of time (e.g., seconds) between the first beacon signal and the second beacon signal and/or a number of times that the local counter incremented (e.g., ticks counted by the local counter) between the first beacon signal and the second beacon signal. For example, the duration between the first beacon signal and the second beacon signal was 300 ticks (e.g., 400-100), resulting in a drift of 6 ticks per 300 ticks in this example. Note that this example is simplified to illustrate the concepts; if the first device 102-1 transmits a beacon every two seconds and the local counter uses a fixed frequency of 32.768 kHz, the drift may be 6 ticks per 65536 ticks or similar. As discussed above, in a stable environment the drift may remain constant over time (e.g., over a fixed duration), although variations in temperatures and devices may affect the drift and the drift may vary without departing from the present disclosure. In addition, the present disclosure is not limited thereto and the second device 102-2 may determine the duration associated with the drift using other techniques without departing from the present disclosure. For example, the second device 102-2 may determine the number of times that the remote counter incremented (e.g., ticks counted by the remote counter) without departing from the present disclosure. However, as the remote counter is adjusted based on the first device 102-1 synchronizing with another device, the remote counter may not accurately indicate a duration of time elapsed.

The ad hoc network 110 may include a single source device (e.g., device 102 that increments a local counter without accounting for drift) and one or more synchronized devices (e.g., device 102 that increments a local counter while accounting for drift). The ad hoc network 110 is made up of individual connections between devices 102, each connection comprising a transmitting device and a receiving device. For example, while each of the devices 102 may communicate in either direction (e.g., transmit and receive data), the transmitting device transmits a beacon signal and the receiving device synchronizes to the transmitting device based on the beacon signal. For example, FIG. 1 illustrates the first device 102-1 as the transmitting device and the second device 102-2 as the receiving device, meaning that the second device 102-2 connects and synchronizes to the first device 102-1.

To accurately synchronize the devices 102, the ad hoc network 110 forms a tree structure and avoids loops. Thus, there is a hierarchy within the ad hoc network 110 based on a number of hops between each device 102 and the source device. As mentioned above, the number of hops may be equal to a number of connections in a path between each device 102 and the source device. For example, the first device 102-1 may be directly connected to the source device and therefore a number of hops associated with the first device 102-1 is equal to one. As will be discussed in greater detail below, the number of hops between the first device 102-1 and the source device may be stored by the first device 102-1 as a direct cost (DC) (e.g., $DC_1=1$). The first device 102-1 may transmit a beacon signal to the second device 102-1 indicating this value as a source cost (SC). The source cost ($SC_1$) transmitted by the first device 102-1 is equal to the direct cost ($DC_1$) stored on the first device 102-1 (e.g., $SC_1=DC_1=1$), and the second device 102-2 may use the source cost ($SC_1$) included in the beacon signal to determine a direct cost ($DC_2$) for the second device (e.g., $DC_2=SC_1+1$). Thus, the second device 102-2 may determine that the direct cost ($DC_2$) for the second device 102-2 is two, indicating that there are two hops between the second device 102-2 and the source device.

A plurality of devices 102 connected in the ad hoc network 110 may form a tree structure with a source device at the beginning (e.g., root of the tree structure). The source device does not account for drift as the source device does not synchronize to another device (e.g., adjust a source counter). The source device may be connected to one or more synchronized devices that synchronize to the source counter. For each connection, the source device acts as a transmitting device and the one or more synchronized devices act as receiving devices. For example, the source device may transmit a first beacon signal to a first synchronized device and the first synchronized device may synchronize to the source device using the first beacon signal. The first synchronized device may synchronize to the source device by determining a first drift between contents of a first counter on the first synchronized device and contents of a source counter on the source device (the contents of the source counter being included in the first beacon signal) and adjusting the contents of the first counter based on the first drift. In addition, the first synchronized device may be connected to one or more additional synchronized devices (e.g., devices 102 further down the tree structure in the ad hoc network 110). For example, after adjusting the first counter, the first synchronized device may act as a transmitting device and transmit a second beacon signal (including contents of the first counter) to a second synchronized device. The second synchronized device may synchronize to the first synchronized device by determining a second drift between contents of a second counter on the second synchronized device and contents of the first counter and adjusting the contents of the second counter based on the second drift.

As used herein, "synchronizing" refers to the process of modifying contents of a local counter (located on a receiving device) to account for drift between the local counter and a remote counter (located on a transmitting device). Similarly, "drift" refers to a difference between the local counter and the remote counter over time. For example, the local counter may increment a first number of times (e.g., 300 times) during a fixed time period (e.g., 1 second) while the remote counter may increment a second number of times (e.g., 306 times) during the first time period. Therefore, the drift is the difference between the local counter and the remote counter over the first time period (e.g., drift=6). Further, "duration" refers to the fixed time period, which may be determined as a number of seconds or a number of ticks on the local counter. For example, the devices 102 may broadcast beacon signals every 2 seconds, give or take 0.2 seconds, although the disclosure is not limited thereto. To reduce power consumption, the devices 102 may listen for beacon signals opportunistically or periodically (e.g., listen for 1 second every 5 seconds). The frequency that the devices 102 broadcast and/or listen for beacon signals may be programmed based on a desired level of accuracy/precision for synchronization.

The drift may be calculated at least one of two ways. Using a first technique, the drift may be calculated by subtracting a first difference (e.g., $\Delta_1=X_{R,1}-X_{L,1}$) between the local counter and the remote counter at a first time from a second difference (e.g., $\Delta_2=X_{R,2}-X_{L,2}$) between the local counter and the remote counter at a second time (e.g., drift=$\Delta_2-\Delta_1$). For example, the local counter may have an initial value of 100 and a final value of 400, whereas the remote counter may have an initial value of 600 and a final value of 906. Using the first technique, the first difference is equal to 500 (e.g., $\Delta_1=600-100$), the second difference is equal to 506 (e.g., $\Delta_2=906-400$) and the resulting drift is equal to 6 (e.g., drift=506-500). Using the first technique, the receiving device may reduce a memory consumption significantly (e.g., storing only the difference between the remote counter and the local counter at the first time) at the expense of calculating the duration. Alternatively, the receiving device may reduce the memory consumption while being able to calculate the duration (e.g., storing the difference between the remote counter and the local counter at the first time along with either the contents of the remote counter or the local counter). However, calculating the duration requires an additional step after determining the drift.

Using a second technique, the drift may be calculated by subtracting a first difference (e.g., $\Delta_1=X_{L,2}-X_{L,1}$) between the local counter at the first time and the second time from a second difference (e.g., $\Delta_2=X_{R,2}-X_{R,1}$) between the remote counter at the first time and the second time (e.g., drift=$\Delta_2-\Delta_1$). Using the second technique, the first difference is equal to 300 (e.g., $\Delta_1=400-100$), the second difference is equal to 306 (e.g., $\Delta_2=906-600$) and the resulting drift is equal to 6 (e.g., drift=306-300). While the second technique requires additional memory (e.g., storing contents of the local counter and the remote counter at the first time), the second technique may reduce a processing requirement as the duration is equal to either the first difference or the second difference.

FIG. 2A illustrates an example of an ad hoc network including multiple devices according to embodiments of the present disclosure. As illustrated in FIG. 2A, the ad hoc network 110 may include a devices 102-1 to 102-5, each of the devices 102 including a crystal oscillator 210 and a counter 212. As discussed above, the present disclosure is not limited thereto and the crystal oscillator 210 may be oscillator circuitry or the like without departing from the present disclosure. FIG. 2A does not indicate individual connections between the devices 102, and the individual connections may vary over time. For example, a first device 102-1 may act as a source device initially and a second device 102-2, a third device 102-3, a fourth device 102-4 and a fifth device 102-5 may connect to each other and synchronize respective counters 212 based on the counter 212 in the first device 102-1. However, at a later point in time the fourth device 102-4 may act as the source device and the remaining devices 102 may synchronize based on the counter 212 in the fourth device 102-4. Thus, the ad hoc network 110 may adapt and change as devices 102 move in and out of range of each other, restart, stop transmitting for a period of time and/or disconnect from the ad hoc network 110.

FIG. 2B illustrates an example of a beacon signal according to embodiments of the present disclosure. As illustrated in FIG. 2B, a beacon signal 220 may include beacon information, such as device identification (DID) associated with a transmitting device (e.g., device transmitting the beacon signal 220), source identification (SID) associated with a source device (e.g., a beginning of the ad hoc network 110), contents of a remote counter (e.g., a tick circular counter (TC) on the transmitting device) and/or a source cost (SC) indicating a number of hops from the transmitting device to the source device (e.g., a number of connections in a first path between the transmitting device and the source device).

Examples of beacon signals may include Bluetooth® Low Energy (BLE) or Bluetooth® Smart advertising signals. For example, the beacon signal 220 may use an open protocol such as AltBeacon. However, the present disclosure is not limited thereto and the beacon signal 220 may use a proprietary protocol without departing from the present disclosure. As illustrated in FIG. 2B, the beacon signal 220 may include a total of 20 bytes split between the four fields. For example, the DID field may include 8 bytes (e.g., bytes [0] through [7]), the SID field may include 8 bytes (e.g., bytes [8] through [15]), the TC field may include 3 bytes (e.g., bytes [16] through [18]) and the SC field may include 1 byte (e.g., byte [19]).

Using this implementation, the system 100 may generate an ad hoc network with a maximum of 255 hops due to the SC field including only 1 byte of information. While the ad hoc network may include a maximum of 255 hops, the system 100 may optimize the network to a minimum of 2 hops if devices within the ad hoc network are within proximity (e.g., distance between devices is below a threshold). For example, the system 100 may generate the ad hoc network by creating individual connections, such that the ad hoc network includes a number of connections (e.g., the ad hoc network grows to 10 hops) before optimizing the ad hoc network to reduce the number of connections (e.g., the ad hoc network optimizes to 2 hops, although networks extending across longer distances may require additional hops). However, the beacon signal 220 is only intended as an illustration of a single implementation and the disclosure is not limited thereto. Instead, the SC field may include additional bytes of information to allow for more than 255 hops, either at the expense of one of the other fields (e.g., the beacon signal 220 includes a total of 20 bytes of information), or, in some examples, in addition to the other fields (e.g., the beacon signal 220 includes more than 20 bytes of information). Therefore, while AltBeacon is mentioned as a potential implementation, the present disclosure is not limited thereto and the beacon signal 220 may use any beacon protocol known to one of skill in the art.

As the beacon signal 220 is transmitted by the transmitting device as a beacon (e.g., unilateral and omnidirectional transmission), the ad hoc network is not limited to a certain capacity because there is no saturation limit. For example, a transmitting device may transmit the beacon signal 220 to one device or to a thousand devices (depending on a number of devices within range) without affecting a processing and/or bandwidth consumption of the transmitting device.

In some examples, such as when all devices in the ad hoc network are within proximity to each other, the system 100 may optimize the ad hoc network to a minimum of 2 hops using the beacon signal 220 illustrated in FIG. 2B. However, the ad hoc network determines a source device based on timing associated with initial beacon signals between source devices. For example, if the first device 102-1 transmits a beacon signal to the second device 102-2 initially, the second device 102-2 may store the first device 102-1 as the source device. However, if the second device 102-2 transmits a beacon signal to the first device 102-1 initially, the first device 102-1 may store the second device 102-2 as the source device. While using time based connections simplifies generating and optimizing the ad hoc network, this may result in inefficiencies. For example, the second device 102-2 may be in proximity (e.g., capable of transmitting beacon signals) to four devices (e.g., the first device 102-1, the third device 102-3, the fourth device 102-4 and the fifth device 102-5), whereas the first device 102-1 may be in proximity to only two devices (e.g., the second device 102-2 and the third device 102-3). As a result, the ad hoc network may only be optimized to a minimum of 2 hops with the first device 102-1 as the source device, whereas the ad hoc network could be optimized to a minimum of 1 hop with the second device 102-2 as the source device.

Further, when the ad hoc network extends over a large area, these inefficiencies can result in additional hops and/or multiple discrete ad hoc networks instead of a single unified ad hoc network. For example, four devices (e.g., devices A-D (not shown)) may extend in a direction and only communicate with adjacent neighbors (e.g., device A is in proximity to only device B, device B is in proximity to device A and device C, device C in proximity to device B and device D, and device D is only in proximity to device C). In certain situations when forming an ad hoc network, device A and device D may each be source devices. As device A doesn't receive a beacon signal from device C and/or device D (and similarly, device D doesn't receive a beacon signal from device A and/or device B), this may create two separate ad hoc networks (e.g., devices A-B are in a first ad hoc network and devices C-D are in a second ad hoc network).

To further optimize the ad hoc network, the system 100 may include additional information in the beacon signal 220 that is not illustrated in FIG. 2B. For example, in some examples the beacon signal 220 may include an additional field indicating a number of beacon signals received by the transmitting device. Additionally or alternatively, the beacon signal 220 transmitted by non-source devices may remain the same (e.g., beacon signal 220 illustrated in FIG. 2B) but modified beacon signals transmitted by a source device may indicate a number of beacon signals received by the source device in place of the SC field. For example, instead of transmitting the beacon signal 220 illustrated in FIG. 2B (e.g., DID=SID and SC=0, with SC=0 indicating that there are no hops between the DID and the SID), a source device may transmit a modified beacon signal indicating the number of beacon signals received by the source device (e.g., DID=SID and SC=1, with SC=1 indicating that the source device receives a single beacon signal). Upon receiving this modified beacon signal, a receiving device may determine that the beacon signal came from a source device (because DID=SID), that the SC of the source device is inherently equal to zero (and therefore a DC for the receiving device is equal to one) and that the SC=1 included in the beacon signal indicates that the source device receives a single beacon signal.

Therefore, in some examples the receiving device may use the number of beacon signals received by the transmitting device (stored in the beacon signal) to selectively re-initialize the receiving device (e.g., delete stored configuration information and store the receiving device as a source device). For example, the devices 102 illustrated in FIG. 2A may form an ad hoc network 110 configured with the first device 102-1 as the source device (resulting in the ad hoc network including 2 hops, as the fourth device 102-4 and the fifth device 102-5 do not receive a beacon signal from the first device 102-1). The first device 102-1 may transmit the modified beacon signal described above, indicating that the first device 102-1 receives a first number of beacon signals (e.g., 2 beacon signals, received from the second device 102-2 and the third device 102-3). Upon receiving the modified beacon signal, the second device 102-2 may compare the first number of beacon signals (e.g., 2) to a second number of beacon signals received by the second device 102-2 (e.g., 4 beacon signals, received from the first device 102-1, the third device 102-3, the fourth device 102-4 and the fifth device 102-5). As the second number is greater than the first number, the second device 102-2 may re-initialize and transmit a beacon signal as a source device. In response to receiving the beacon signal from the second device 102-2, the first device 102-1 may store the second device 102-2 as the source device and the ad hoc network 110 may update source identification information and optimize, resulting in each of the first device 102-1, the third device 102-3, the fourth device 102-4 and the fifth device 102-5 connecting directly to the second device 102-2 (resulting in the ad hoc network 110 including 1 hop). Thus, the system 100 may implicitly determine that the source device (e.g., first device 102-1) is on an edge of the ad hoc network 110 and optimize the ad hoc network 110 so that the second device 102-2 is the source device.

As another example, device A may transmit a modified beacon signal indicating that device A receives a first number of beacon signals (e.g., 1 beacon signal received from device B). Upon receiving the modified beacon signal, device B may compare the first number of beacon signals (e.g., 1) to a second number of beacon signals received by the second device (e.g., 2 beacon signals, received from device A and device C). As the second number is greater than the first number, device B may re-initialize and transmit a beacon signal as a source device. In response to receiving the beacon signal from device B, device A may store device B as the source device. Similarly, device D may transmit a modified beacon signal indicating that device D receives a third number of beacon signals (e.g., 1 beacon signal received from device C). Upon receiving the modified beacon signal, device C may compare the third number of beacon signals (e.g., 1) to a fourth number of beacon signals received by device C (e.g., 2 beacon signals, received from device B and device D). As the fourth number is greater than the third number, device C may re-initialize and transmit a beacon signal as a source device. In response to receiving the beacon signal from device C, device D may store device C as the source device. Depending on timing between device B and device C, one of the devices will receive a beacon signal from the other and store the other device as the source device, resulting in a unified ad hoc network. For example, device B may transmit a beacon signal initially, and, in response to receiving the beacon signal, device C may store device B as the source device. Therefore, the two ad hoc networks (e.g., first ad hoc network including devices A-B and second ad hoc network including devices C-D) may combine to form a single unified ad hoc network (including devices A-D) with device B as the source device. Thus, the system 100 may implicitly determine that source devices (e.g., devices A and D) are on an edge of the ad hoc network and shift optimize the ad hoc network so that the source devices are closer to a center of the ad hoc network, which enabled the two separate ad hoc networks to combine to form a single network.

While the modified beacon signal described above indicates a number of beacon signals received by the source device, the present disclosure is not limited thereto. Instead, the modified beacon signal may indicate a number of beacon signals received by a transmitting device, a number of beacon signals associated with a unique source identification received by the source device, a number of beacon signals associated with a unique source identification received by the transmitting device or the like. For example, device B may receive a beacon signal from device A with a first source device (e.g., device A) and a beacon signal from device C with a second source device (e.g., device D). Therefore, even if device A received a first number of beacon signals greater than a second number of beacon signals received by device B, device B may re-initialize based on receiving a greater number of beacon signals associated with a unique source identification.

FIGS. 3A-3B illustrate examples of initializing an ad hoc network according to embodiments of the present disclosure. As illustrated in FIG. 3A, each of the devices 102 may store information associated with the ad hoc network 110. The information may include an identification (ID), a direct cost (DC), a transmitting source identification (TSID), an original source identification (OSID) and an internal tick counter (ITC), as indicated by a legend illustrated in FIG. 3A. For example, the first device 102-1 stores an identification (ID) associated with the first device (e.g., 11), a direct cost (DC) (e.g., a number of hops between the first device 102-1 and a source device, which in this case is 0), an identification associated with a transmitting device (TSID) (e.g., the ID associated with the device that the first device 102-1 synchronizes to), an original source identification (OSID) (e.g., the ID associated with the source device) and an internal tick counter (ITC) (e.g., the local counter 212 stored on the first device 102-1). During initialization, none of the devices 102 are connected to each other and therefore each device 102 stores the device ID as the TSID and OSID (e.g., ID=TSID=OSID) and a value of zero for the DC (e.g., zero hops to the source device as each device 102 is its own source device).

To establish the ad hoc network 110, the devices 102 transmit beacon signals periodically. Based on which device receives a transmitted beacon signal first, the ad hoc network 110 selects one of the devices 102 as the source device. The beacon signals may include a device identification (DID), a source identification (SID), a tick counter (TC) and a source cost (SC), as indicated by a legend illustrated in FIG. 3B and described in greater detail above with regard to FIG. 2B. For example, FIG. 3B illustrates the first device 102-1 transmitting a first beacon signal 310-1 to the second device 102-2 prior to the first device 102-1 receiving a beacon signal. Thus, the first device 102-1 considers itself a source device (e.g., ID=TSID=OSID=11) and the second device 102-1 synchronizes to the first device 102-1. The first beacon signal 310-1 includes a device identification (DID) (e.g., 11), a source identification (SID) (e.g., 11), a value associated with a tick counter (TC) on the first device 102-1 when the first beacon signal 310-1 was transmitted (e.g., X1) and a source cost (SC) (e.g., 0) indicating a number of hops from the first device 102-1 to the source device. Based on the first beacon signal 310-1, the second device 102-2 updates the direct cost (DC) for the second device 102-2 to one (e.g., DC=SC+1), stores the DID as the TSID (e.g., the second device 102-2 is connected to the first device 102-1) and stores the SID as the OSID (e.g., the source device is the first device 102-1).

Similarly, the fourth device 102-4 transmits a second beacon signal 310-2 to the fifth device 102-5 prior to the fourth device 102-4 receiving a beacon signal. Thus, the fourth device 102-4 considers itself a source device (e.g., ID=TSID=OSID=44) and the fifth device 102-5 synchronizes to the fourth device 102-4. The second beacon signal 310-2 includes a DID (e.g., 44), a SID (e.g., 44), a value associated with a TC on the fourth device 102-4 when the second beacon signal 310-2 was transmitted (e.g., X4) and a SC (e.g., 0) indicating a number of hops from the fourth device 102-4 to the source device. Based on the second beacon signal 310-2, the fifth device 102-5 updates the DC for the fifth device 102-5 to one (e.g., DC=SC+1), stores the DID as the TSID (e.g., the fifth device 102-5 is connected to the fourth device 102-4) and stores the SID as the OSID (e.g., the source device is the fourth device 102-4).

After synchronizing with the first device 102-1, the second device 102-2 transmits a third beacon signal 310-3 to the third device 102-3. Thus, the second device 102-2 considers the first device 102-1 the source device (e.g., OSID=11) and the third device 102-3 synchronizes to the second device 102-2. The third beacon signal 310-3 includes a DID (e.g., 22), a SID (e.g., 11), a value associated with a TC on the second device 102-2 when the third beacon signal 310-3 was transmitted (e.g., X2) and a SC (e.g., 1) indicating a number of hops from the second device 102-2 to the source device. Based on the third beacon signal 310-3, the third device 102-3 updates the DC for the third device 102-3 to two (e.g., DC=SC+1), stores the DID as the TSID (e.g., the third device 102-3 is connected to the second device 102-2) and stores the SID as the OSID (e.g., the source device is the first device 102-1).

As illustrated in FIG. 3B, the first device 102-1, the second device 102-2 and the third device 102-3 formed a first ad hoc network while the fourth device 102-4 and the fifth device 102-5 formed a second ad hoc network. Once synchronized to a source device, the devices 102 ignore beacon signals from devices with a different source device.

Figure 4:
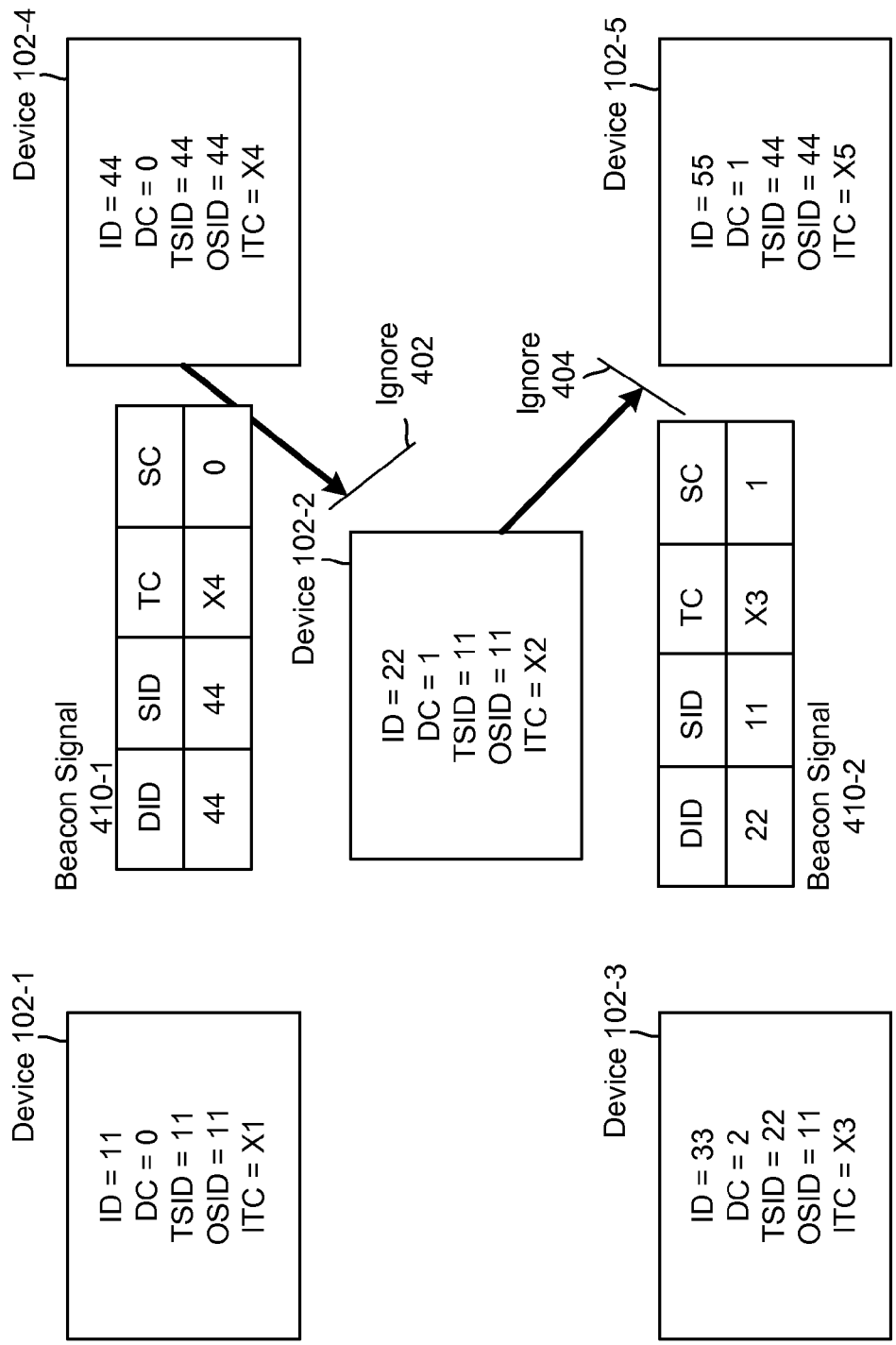
FIG. 4 illustrates an example of ignoring isolated beacon signals according to embodiments of the present disclosure.

FIG. 4 illustrates an example of ignoring isolated beacon signals according to embodiments of the present disclosure. As illustrated in FIG. 4, the fourth device 102-4 may transmit a first beacon signal 410-1 to the second device 102-2 including a DID (e.g., 44), a SID (e.g., 44), a value associated with a TC on the fourth device 102-4 when the first beacon signal 410-1 was transmitted (e.g., X4) and a SC (e.g., 0). The second device 102-2 may compare the SID in the first beacon signal 410-1 to the TSID stored on the second device 102-2 and determine that they do not match (e.g., 44 does not match 11). Therefore, the second device 102-2 may ignore (402) the first beacon signal 410-1 and remain connected to the first device 102-1.

Similarly, the second device 102-2 may transmit a second beacon signal 410-2 to the fifth device 102-5 including a DID (e.g., 22), a SID (e.g., 11), a value associated with a TC on the second device 102-2 when the second beacon signal 410-2 was transmitted (e.g., X2) and a SC (e.g., 1). The fifth device 102-5 may compare the SID in the second beacon signal 410-2 to the TSID stored on the fifth device 102-5 and determine that they do not match (e.g., 11 does not match 44). Therefore, the fifth device 102-5 may ignore (404) the second beacon signal 410-2 and remain connected to the fourth device 102-4.

Figure 5A:
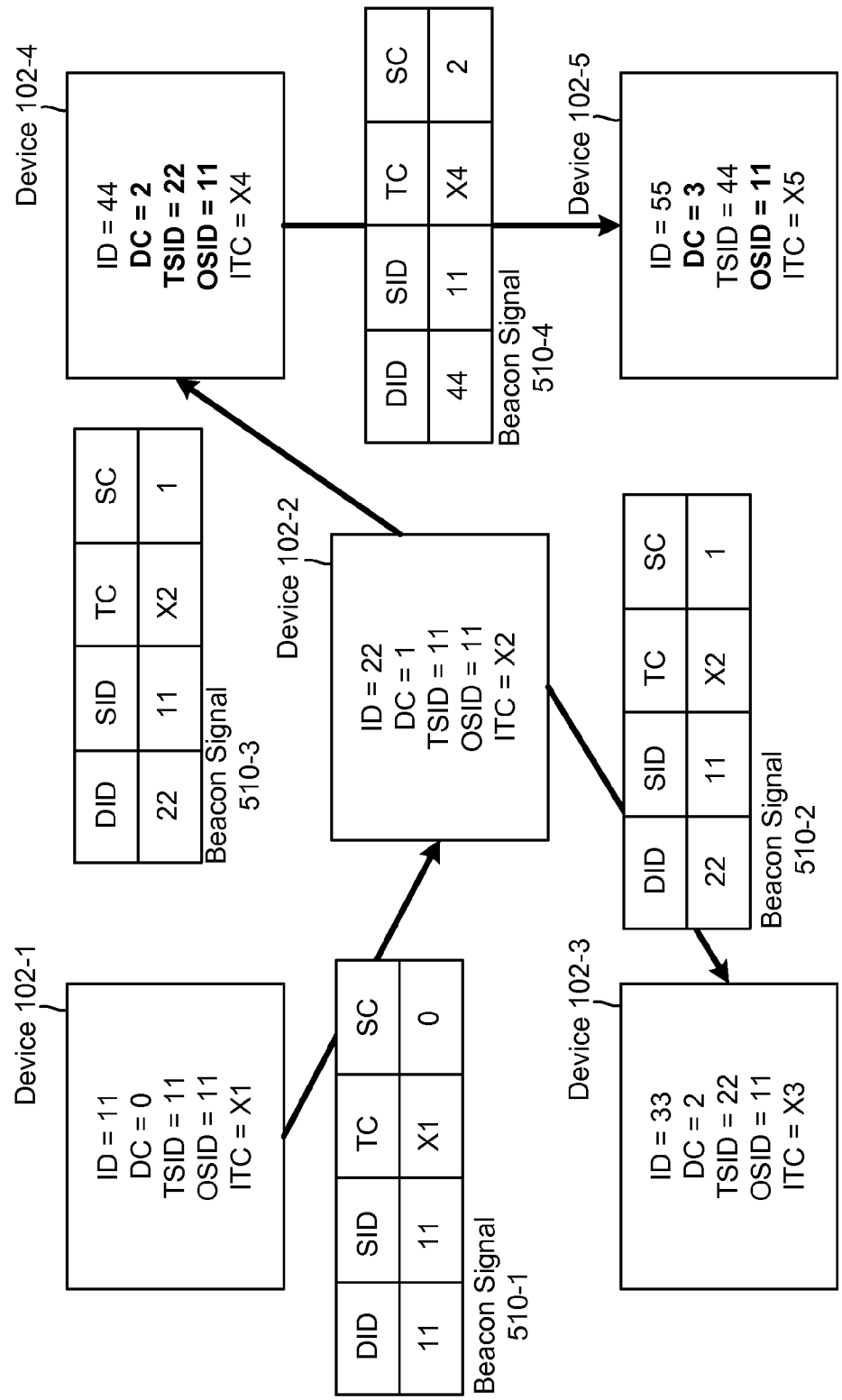
FIGS. 5A-5B illustrate examples of synchronizing multiple devices according to embodiments of the present disclosure.
Figure 5B:
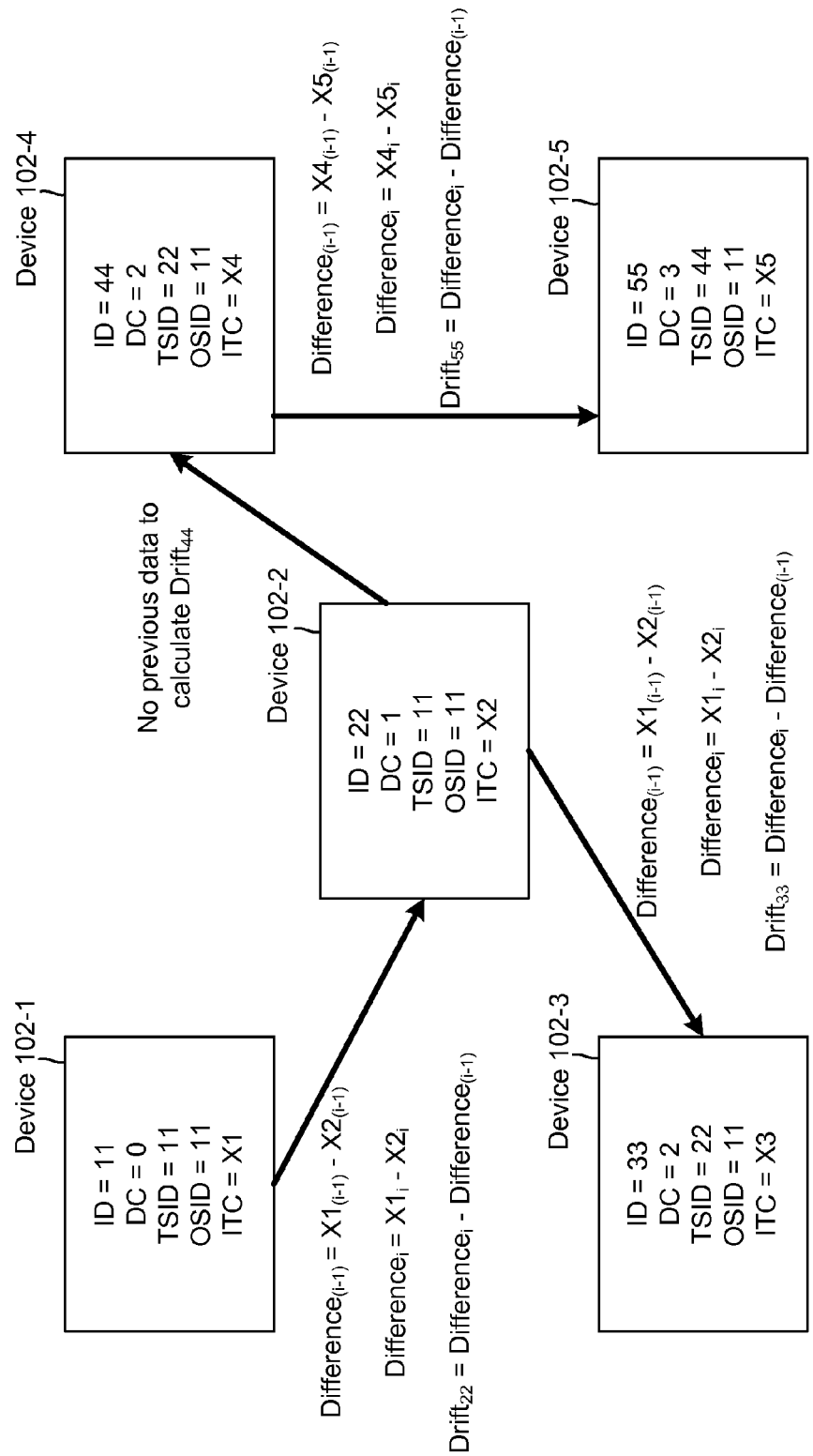

FIGS. 5A-5B illustrate examples of synchronizing multiple devices according to embodiments of the present disclosure. While devices 102 synchronized with a first source device may ignore beacon signals associated with a second source device, the second source device may receive beacon signals associated with the first source device and may synchronize with the first source device. For example, as illustrated in FIG. 5A, the second device 102-2 may transmit a third beacon signal 510-3 to the fourth device 102-4 and the fourth device 102-4 may synchronize with the second device 102-2 (and by extension, the first device 102-1). In this example, the fourth device 102-4 may have received a beacon signal associated with the first device 102-1 prior to the first device 102-1 receiving a beacon signal associated with the fourth device 102-4. However, the present disclosure is not limited thereto and the first device 102-1 may synchronize with the fourth device 102-4 without departing from the present disclosure.

As illustrated in FIG. 5A, the first device 102-1 may transmit a first beacon signal 510-1 to the second device 102-2. As the beacon information included in the first beacon signal 510-1 matches the information stored on the second device 102-2 (e.g., DID=TSID and SID=OSID), the second device 102-2 may synchronize to the first device 102-1 based on the contents of the TC (e.g., X1). Similarly, the second device 102-2 may transmit a second beacon signal 510-2 to the third device 102-3. As the beacon information included in the second beacon signal 510-2 matches the information stored on the third device 102-3 (e.g., DID=TSID and SID=OSID), the third device 102-3 may synchronize to the second device 102-2 based on the contents of the TC (e.g., X2).

However, as discussed above, the second device 102-2 may transmit the third beacon signal 510-3 to the fourth device 102-4 and the fourth device 102-4 may synchronize with the second device 102-2. For example, the fourth device 102-4 may determine that the DC stored on the fourth device 102-4 is zero (indicating that the fourth device 102-4 is not synchronized with another device) and may synchronize to the second device 102-2. Thus, the fourth device 102-4 may store the DID (e.g., 22) and the SID (e.g., 11) included in the third beacon signal 510-3 as the TSID (e.g., 22) and the OSID (e.g., 11) respectively. Based on the SC included in the third beacon signal 510-3, the fourth device 102-4 may determine a new DC of two (e.g., DC=SC+1). At this point, the ad hoc network 110 includes all five devices 102 and the devices may begin to synchronize with the first device 102-1.

The fourth device 102-4 may transmit a fourth beacon signal 510-4 to the fifth device 102-5. As the DID included in the fourth beacon signal 510-4 matches the TSID stored on the fifth device 102-5, the fifth device 102-5 may receive the fourth beacon signal 510-4 and update the information stored in the fifth device 102-5 to match the fourth beacon signal 510-4. For example, the fifth device 102-5 may update the OSID based on the SID (e.g., 11) and may determine a new DC of three (e.g., DC=SC+1). In addition to updating the DC and OSID, the fifth device 102-5 may synchronize with the fourth device 102-4 based on the contents of the TC (e.g., X4).

FIG. 5B illustrates the devices 102 synchronizing respective internal tick counters (ITC) based on the TC received in the beacon signals 510. For example, the second device 102-2 may determine a drift (e.g., $Drift_{22}$) based on a first difference (e.g., difference between the previous ITC value ($X2_{(i-1)}$) and the previous TC value ($X1_{(i-1)}$) and a second difference (e.g., difference between the current ITC value ($X2_i$) and the current TC value ($X1_i$). Similarly, the third device 102-3 may determine a drift (e.g., $Drift_{33}$) based on a first difference (e.g., difference between the previous ITC value ($X3_{(i-1)}$) and the previous TC value ($X2_{(i-1)}$) and a second difference (e.g., difference between the current ITC value ($X3_i$) and the current TC value ($X2_i$). Likewise, the fifth device 102-5 may determine a drift (e.g., $Drift_{55}$) based on a first difference (e.g., difference between the previous ITC value ($X5_{(i-1)}$) and the previous TC value ($X4_{(i-1)}$) and a second difference (e.g., difference between the current ITC value ($X5_i$) and the current TC value ($X4_i$). However, as the fourth device 102-4 was not previously synchronized to the second device 102-2, the fourth device 102-4 cannot determine a drift to synchronize the ITC (e.g., X4) at this time.

While not illustrated in FIG. 5B, the current TC values reflect the drift calculated by the previous device 102. For example, the second device 102-2 determines the drift (e.g., $Drift_{22}$) prior to transmitting the current TC value to the third device 102-3. Thus, any changes due to drift between the first device 102-1 and the second device 102-2 are reflected in the current TC value received by the third device 102-3. Therefore, the drift (e.g., $Drift_{33}$) determined by the third device 102-3 incorporates the drift (e.g., $Drift_{22}$) determined by the second device 102-2. As a result, any drift between the source device (e.g., first device 102-1) and connected devices (e.g., second device 102-2) is accounted for by subsequently connected devices (e.g., third device 102-3).

FIG. 6 illustrates an example of preventing loops in the ad hoc network according to embodiments of the present disclosure. As illustrated in FIG. 6, the fourth device 102-4 may transmit a first beacon signal 610-1 to the first device 102-1. In this example, the first device 102-1 is closer to the source device than the fourth device 102-4 (as the first device 102-1 is the source device at this point in time) and therefore a loop would be formed. Initially, the first device 102-1 may determine that the SID (e.g., 11) of the first beacon signal 610-1 matches the TSID (e.g., 11) stored on the first device 102-1. However, the first device 102-1 may determine that the SID (e.g., 11) included in the first beacon signal 610-1 matches the ID (e.g., 11) stored on the first device 102-1 and may ignore (602) the first beacon signal 610-1 to prevent forming a loop.

Similarly, the fourth device 102-4 may transmit a second beacon signal 610-2 to the third device 102-3. In this example, the third device 102-3 may determine that the SID (e.g., 11) included in the second beacon signal 610-2 matches the TSID (e.g., 11) stored on the third device 102-3. However, the third device 102-3 may determine that a prospective DC (e.g., SC+1=3) via the fourth device 102-4 (e.g., the number of hops between the third device 102-3 and the source device) is equal to or greater than the current DC stored on the third device 102-3 (e.g., 2). Therefore, the third device 102-3 may ignore (604) the second beacon signal 610-2.

FIG. 7 illustrates an example of optimizing an ad hoc network according to embodiments of the present disclosure. As mentioned above, the devices 102 may receive a beacon signal from a transmitting device 102, determine a prospective DC (e.g., SC+1) based on the received beacon signal and may compare the prospective DC to a current DC to determine whether to connect to the transmitting device 102. Thus, the devices 102 may determine to connect to the transmitting device 102 when the prospective DC is less than the current DC (e.g., SC+1<DC), which reduces a number of hops between the device 102 and the source device.

As illustrated previously, the fourth device 102-4 may be connected to the second device 102-2 and may store values of DC=2, TSID=22 and OSID=11. As illustrated in FIG. 7, the first device 102-1 may transmit a first beacon signal 710-1 to the fourth device 102-4. The fourth device 102-4 may determine that the SID (e.g., 11) matches the TSID (e.g., 11) and that the prospective DC (e.g., SC+1=0+1=1) is less than the current DC (e.g., 2). Therefore, the fourth device 102-4 may determine to connect to the first device 102-1 and may update the information stored on the fourth device 102-4 to store values of DC=1 and TSID=11.

Similarly, as illustrated previously, the fifth device 102-5 may be connected to the fourth device 102-4 and may store values of DC=3, TSID=44 and OSID=11. As illustrated in FIG. 7, the second device 102-2 may transmit a second beacon signal 710-2 to the fifth device 102-5. The fifth device 102-5 may determine that the SID (e.g., 11) matches the TSID (e.g., 11) and that the prospective DC (e.g., SC+1=1+1=2) is less than the current DC (e.g., 3). Therefore, the fifth device 102-5 may determine to connect to the second device 102-2 and may update the information stored on the fifth device 102-5 to store values of DC=2 and TSID=22.

The devices 102 included in the ad hoc network 110 may connect to a source device 102 using any number of hops. In some examples, the beacon signal may indicate the SC using 1 byte of information, limiting the number of hops to 255. However, the present disclosure is not limited thereto and the number of hops may vary. If the devices 102 included in the ad hoc network 110 are in proximity to each other, the ad hoc network 110 may be optimized to a maximum of 2 hops.

Figure 8B:
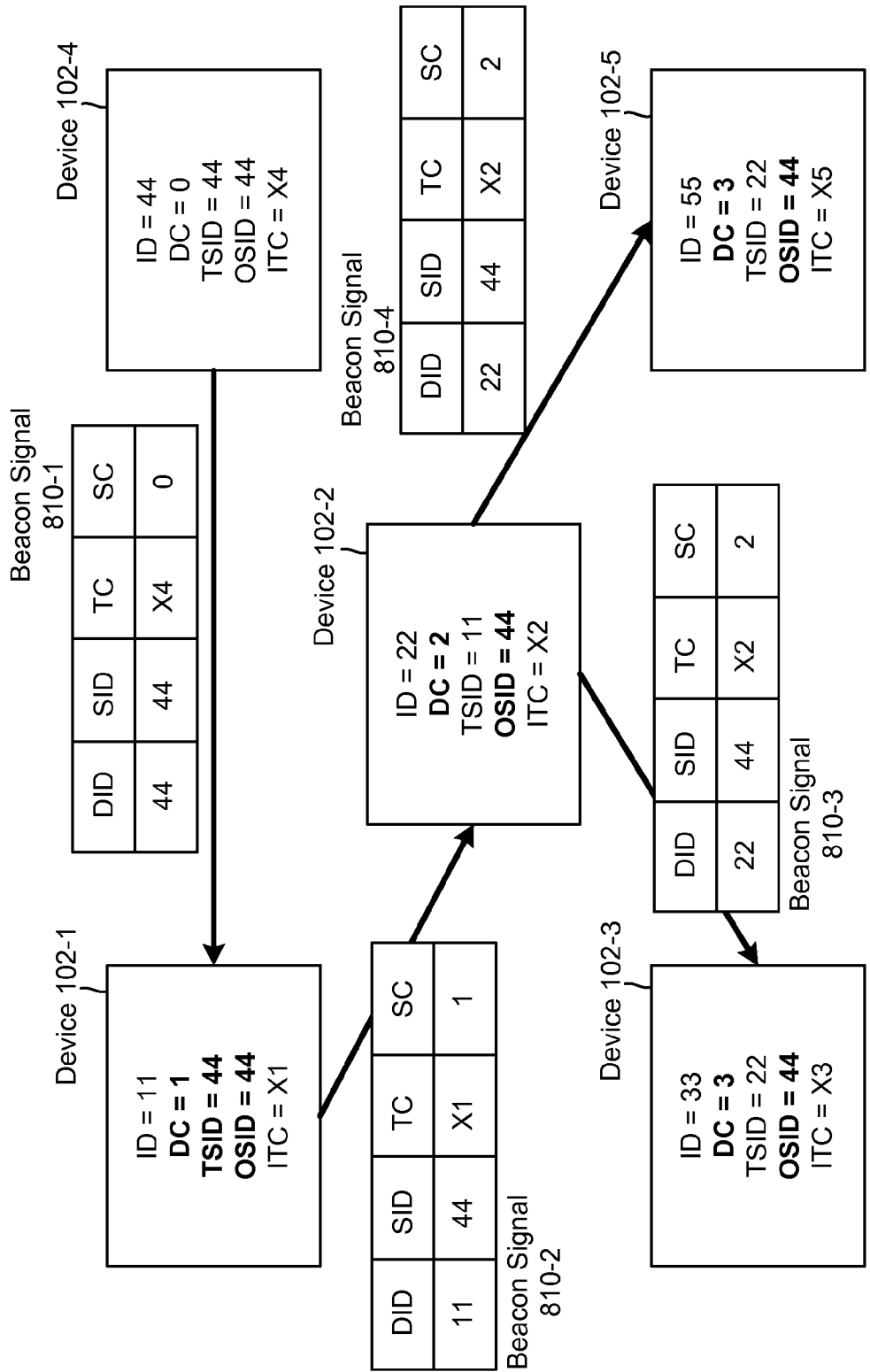

FIGS. 8A-8B illustrate examples of timeout and re-initialization according to embodiments of the present disclosure. As illustrated in FIG. 8A, the fourth device 102-4 may not receive a beacon signal associated with the first device 102-1 for longer than a threshold. For example, the fourth device 102-4 may not receive a beacon signal from the second device 102-2, the first device 102-1 or any other device 102 associated with the first device 102-1 (e.g., TSID=11) for longer than a period of time (e.g., 3 minutes). After the period of time, the fourth device 102-4 may re-initialize using the fourth device 102-4 as a source device. Therefore, the fourth device 102-4 may store values of DC=0, TSID=44 and OSID=44.

After re-initializing, the fourth device 102-4 may continue to receive and transmit beacon signals. For example, the fourth device 102-4 may receive a beacon signal from the second device 102-2, as illustrated in FIG. 5A, and may connect to the ad hoc network 110 using the first device 102-1 as the source device (e.g., TSID=11). However, the fourth device 102-4 may instead transmit a beacon signal to the first device 102-1 while the fourth device 102-4 considers itself the source device (e.g., prior to synchronizing with the first device 102-1). As illustrated in FIG. 8B, the fourth device 102-4 may transmit a first beacon signal 810-1 to the first device 102-1. As the first device 102-1 is not synchronized to another device (e.g., ID=TSID=OSID), the first device 102-1 may accept the SID indicated in the first beacon signal 810-1 as the source device. Thus, the first device 102-1 may store values of DC=1, TSID=44 and OSID=44 and synchronize based on the fourth device 102-4.

As the first device 102-1 is no longer the source device, the other devices 102 may receive subsequent beacon signals and propagate the change made by the first device 102-1. For example, the first device 102-1 may transmit a second beacon signal 810-2 and the second device 102-2 may determine that the DID (e.g., 11) matches the TSID (e.g., 11) stored on the second device 102-2 and therefore store values of DC=2 and OSID=44. Similarly, the second device 102-2 may transmit a third beacon signal 810-3 to the third device 102-3 and a fourth beacon 810-4 to the fifth device 102-5. The third device 102-3 and the fifth device 102-5 may determine that the DID (e.g., 22) matches the TSID (e.g., 22) and therefore store values of DC=3 and OSID=44.

While not illustrated in FIG. 8B, the third device 102-3 and the fifth device 102-5 may subsequently receive beacon signals from the first device 102-1 and/or the fourth device 102-4 and optimize the network by connecting to the first device 102-1 and/or the fourth device 102-4. For example, the third device 102-3 may determine that the SID (e.g., 44) included in a beacon signal from the first device 102-1 matches the TSID (e.g., 44) stored on the third device 102-3 and determine that the SC (e.g., 1) included in the beacon signal results in a prospective DC of two (e.g., SC+1) that is less than the current DC (e.g., 3). Therefore, the third device 102-3 may connect to the first device 102-1, storing values of DC=2 and TSID=11.

Figure 9A:
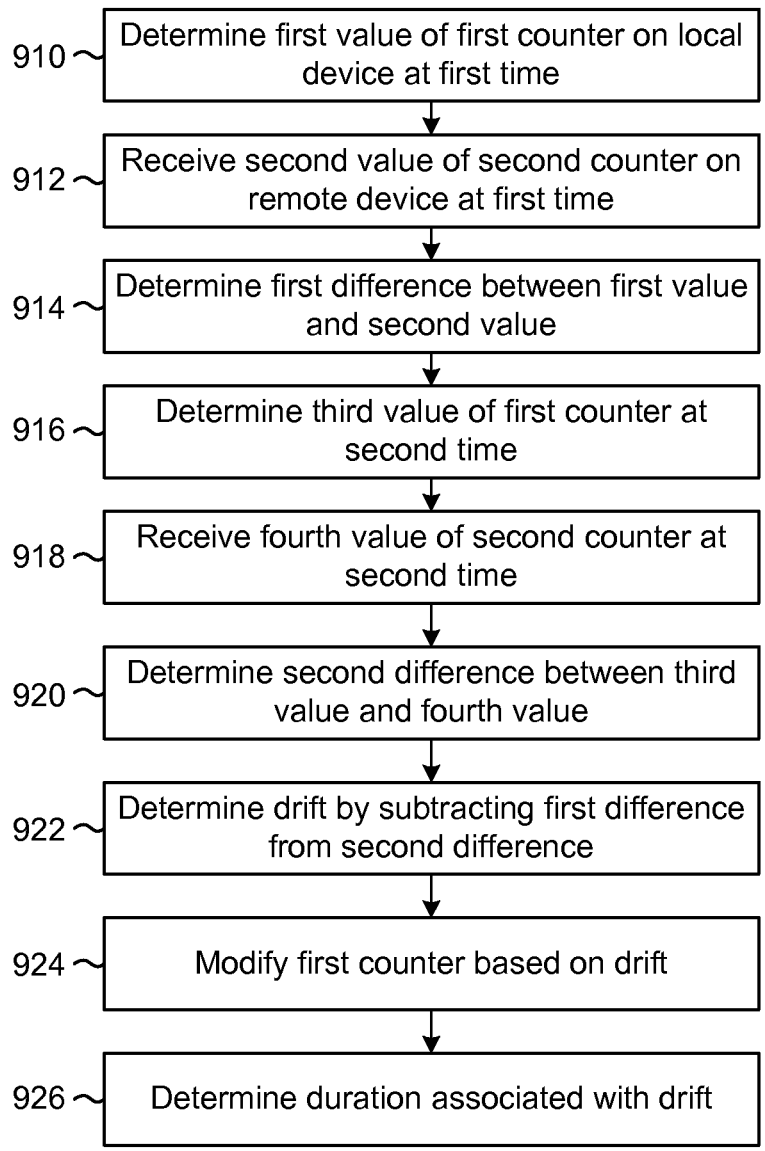
FIGS. 9A-9B are flowcharts conceptually illustrating example methods for synchronizing devices according to embodiments of the present disclosure.
Figure 9B:
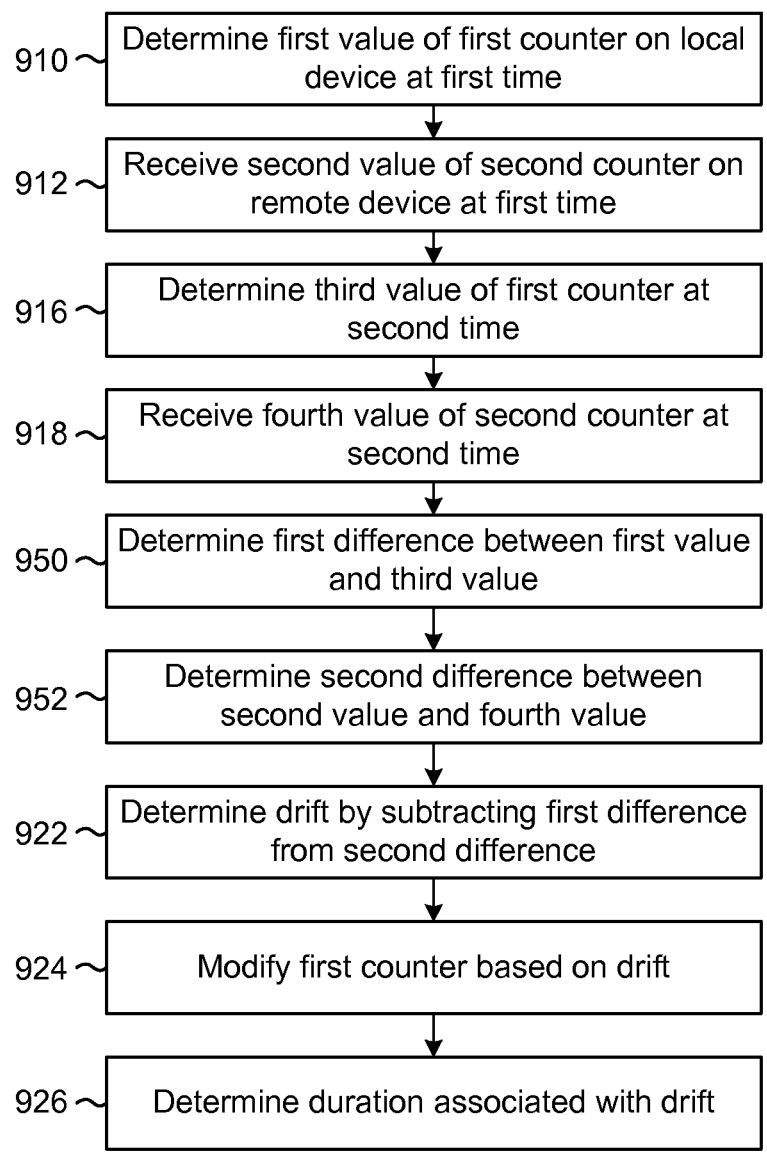

FIGS. 9A-9B are flowcharts conceptually illustrating example methods for synchronizing devices according to embodiments of the present disclosure. As discussed in greater detail above, using the first technique a local device 102 (e.g., receiving device synchronizing to a remote/transmitting device) may determine (910) a first value of a first counter on the local device corresponding to a first time, may receive (912) a second value of a second counter on the remote device corresponding to the first time and determine (914) a first difference between the first value and the second value. Thereafter, the local device 102 may determine (916) a third value of the first counter corresponding to a second time, may receive (918) a fourth value of the second counter corresponding to the second time and determine (920) a second difference between the third value and the fourth value. The local device 102 may determine (922) a drift by subtracting the first difference from the second difference, may modify (924) the first counter based on the drift and may determine (926) a duration associated with the drift.

Using the second technique described above, the local device 102 may determine (910) the first value of the first counter on the local device corresponding to the first time, may receive (912) the second value of the second counter on the remote device corresponding to the first time, determine (916) the third value of the first counter corresponding to the second time and may receive (918) the fourth value of the second counter corresponding to the second time. The local device 102 may determine (950) a first difference between the first value and the third value and determine (952) a second difference between the second value and the fourth value. The local device 102 may determine (922) the drift by subtracting the first difference from the second difference, may modify (924) the first counter based on the drift and may determine (926) a duration associated with the drift. For example, the duration may be equal to the first difference (e.g., difference between the first value of the first counter corresponding to the first time and the third value of the first counter corresponding to the third time), which may be a number of ticks counted by the first counter between receiving the second value and the fourth value.

Figure 10A:
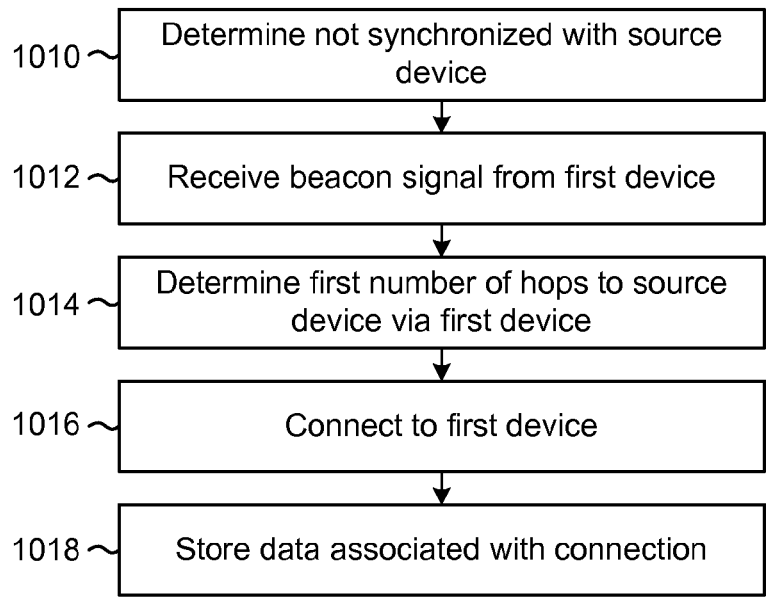
FIGS. 10A-10C are flowcharts conceptually illustrating example methods for optimizing an ad hoc network according to embodiments of the present disclosure.
Figure 10B:
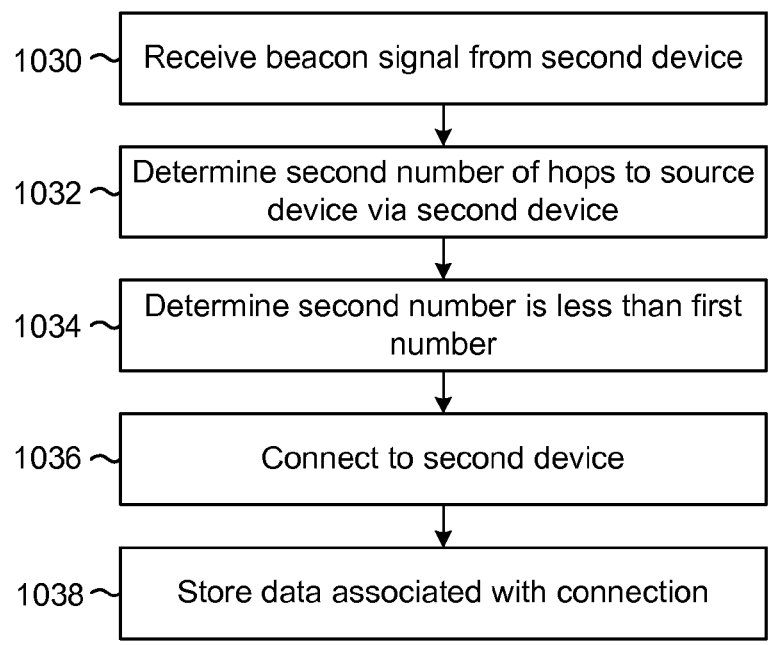
Figure 10C:
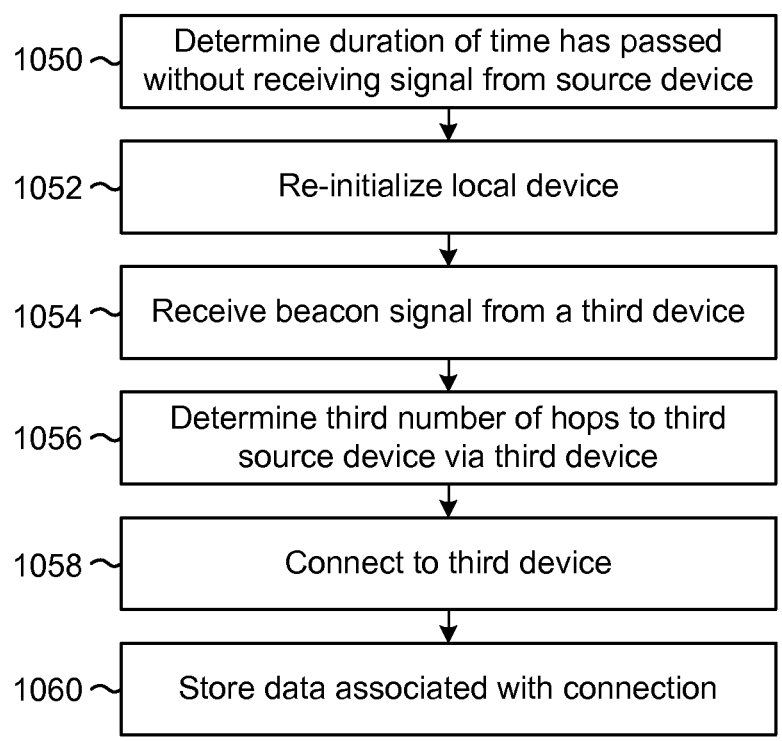

FIGS. 10A-10C are flowcharts conceptually illustrating example methods for optimizing an ad hoc network according to embodiments of the present disclosure. For example, FIG. 10A illustrates flowcharts associated with an initialization step, FIG. 10B illustrates flowcharts associated with an optimization step and FIG. 10C illustrates flowcharts associated with a time out step.

As illustrated in FIG. 10A, a local device may determine (1010) that the local device is not synchronized with a source device, may receive (1012) a beacon signal from a first device associated with a first source device, may determine (1014) a first number of hops to the first source device via the first device, may connect (1016) to the first device and may store (1018) data associated with the connection. Thus, the local device may join an ad hoc network during an initialization step, as discussed above with regard to FIGS. 3A-3B, and synchronize to the first device (and by extension, the first source device), as discussed above with regard to FIGS. 5A-5B.

While not illustrated in FIG. 10A, in some examples the local device may determine that the local device is not synchronized with a source device and may transmit beacon signals to surrounding devices. In this example, the surrounding devices may connect to the local device and select the local device as a source device.

As illustrated in FIG. 10B, the local device may receive (1030) a beacon signal from a second device associated with a second source device, may determine (1032) a second number of hops to the second source device via the second device, may determine (1034) that the second number is less than the first number (e.g., SC+1<DC), may connect (1036) to the second device and may store (1038) data associated with the connection. Thus, the local device may optimize the ad hoc network, as discussed above with regard to FIGS. 5A and 7.

As illustrated in FIG. 10C, the local device may determine (1050) that a duration of time has passed without receiving a beacon signal associated with the source device and may re-initialize (1052) the local device. The local device may receive (1054) a beacon signal from a third device associated with a third source device, may determine (1056) a third number of hops to the third source device via the third device, may connect (1058) to the third device and may store (1060) data associated with the connection. While FIG. 10C illustrates the third device being associated with a third source device, the third device may be associated with the first device and/or the second device without departing from the present disclosure. Thus, the local device may time out and re-initialize, as discussed above with regard to FIG. 8A.

While not illustrated in FIG. 10C, in some examples the local device may re-initialize and may transmit beacon signals to surrounding devices, as discussed above with regard to FIG. 8B. In this example, the surrounding devices may connect to the local device and select the local device as the source device.

Figure 11A:
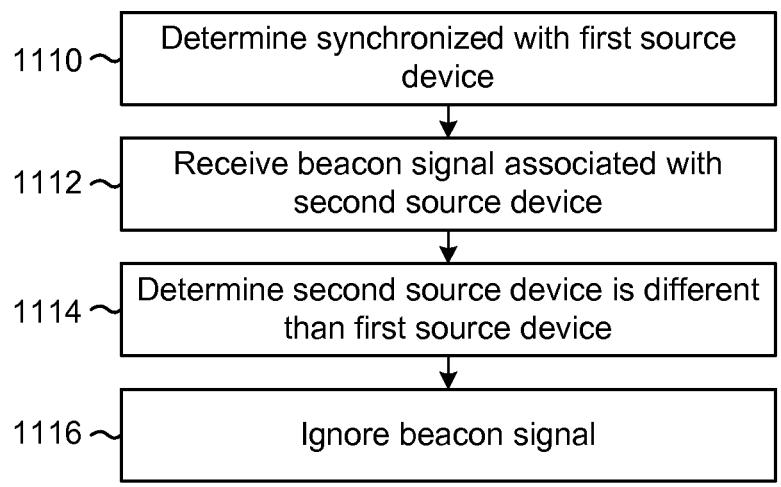
FIGS. 11A-11C are flowcharts conceptually illustrating example methods for ignoring beacon signals according to embodiments of the present disclosure.
Figure 11B:
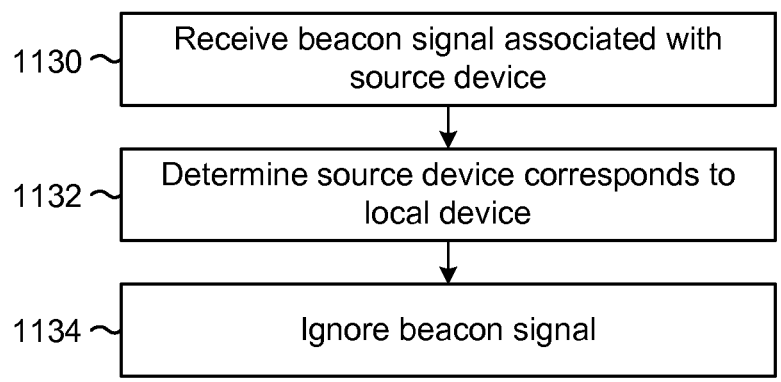
Figure 11C:
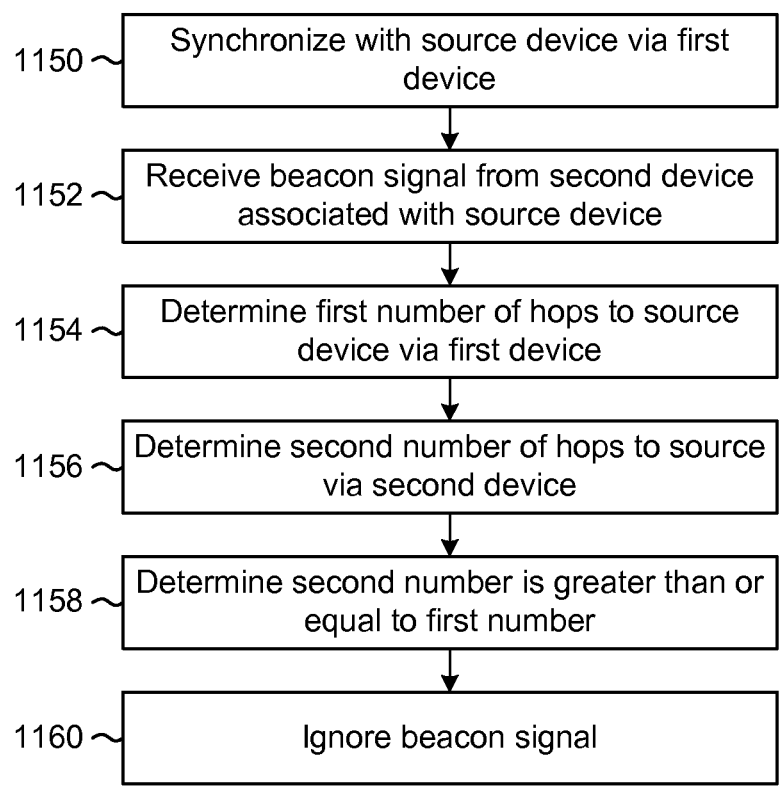

FIGS. 11A-11C are flowcharts conceptually illustrating example methods for ignoring beacon signals according to embodiments of the present disclosure. As illustrated in FIG. 11A, a local device may determine (1110) that the local device is synchronized with a first source device, may receive (1112) a beacon signal associated with a second source device, may determine (1114) that the second source device is different than the first source device and may ignore (1116) the beacon signal. Thus, the local device may remain synchronized with the first source device, as discussed in greater detail above with regard to FIG. 4.

As illustrated in FIG. 11B, the local device may receive (1130) a beacon signal associated with a source device, may determine (1132) that the source device corresponds to the current device and may ignore (1134) the beacon signal. Thus, the local device may avoid forming a loop, as discussed in greater detail above with regard to FIG. 6.

As illustrated in FIG. 11C, the local device may synchronize (1150) with a source device via a first device, may receive (1150) a beacon signal from a second device associated with the source device, may determine (1154) a first number of hops to the source device via the first device, may determine (1156) a second number of hops to the source device via the second device, may determine (1158) that the second number is greater than or equal to the first number and may ignore (1160) the beacon signal. Thus, the local device may remain connected to the first device, as discussed in greater detail above with regard to FIG. 6.

Using the techniques described above, devices 102 may form an ad hoc network 110. Thus, the techniques enable out of the box, hands free synchronization whereby the devices 102 may connect and synchronize autonomously. The devices 102 may autonomously optimize the ad hoc network 110 and form additional connections as necessary in order to reduce a number of hops within the ad hoc network 110. In addition, by synchronizing the devices 102 in the ad hoc network 110, the ad hoc network 110 may enable additional functionality and/or more sophisticated applications. For example, devices 102 may be synchronized to accurately reproduce sounds using multiple speakers/devices, including surround sound or multi-room playback. As another example, devices 102 may be synchronized to accurately stitch image data and/or video data captured by separate cameras/devices or combine audio data captured by separate microphones/devices. In some examples, display devices may be synchronized to display images at the same time on multiple displays/devices. In addition, speakers, cameras, microphones, displays and/or other devices may be synchronized together to enable additional or more sophisticated functionality. To benefit from the synchronization, application processes running on the devices 102 may align their events with the synchronized counter.

Figure 12:
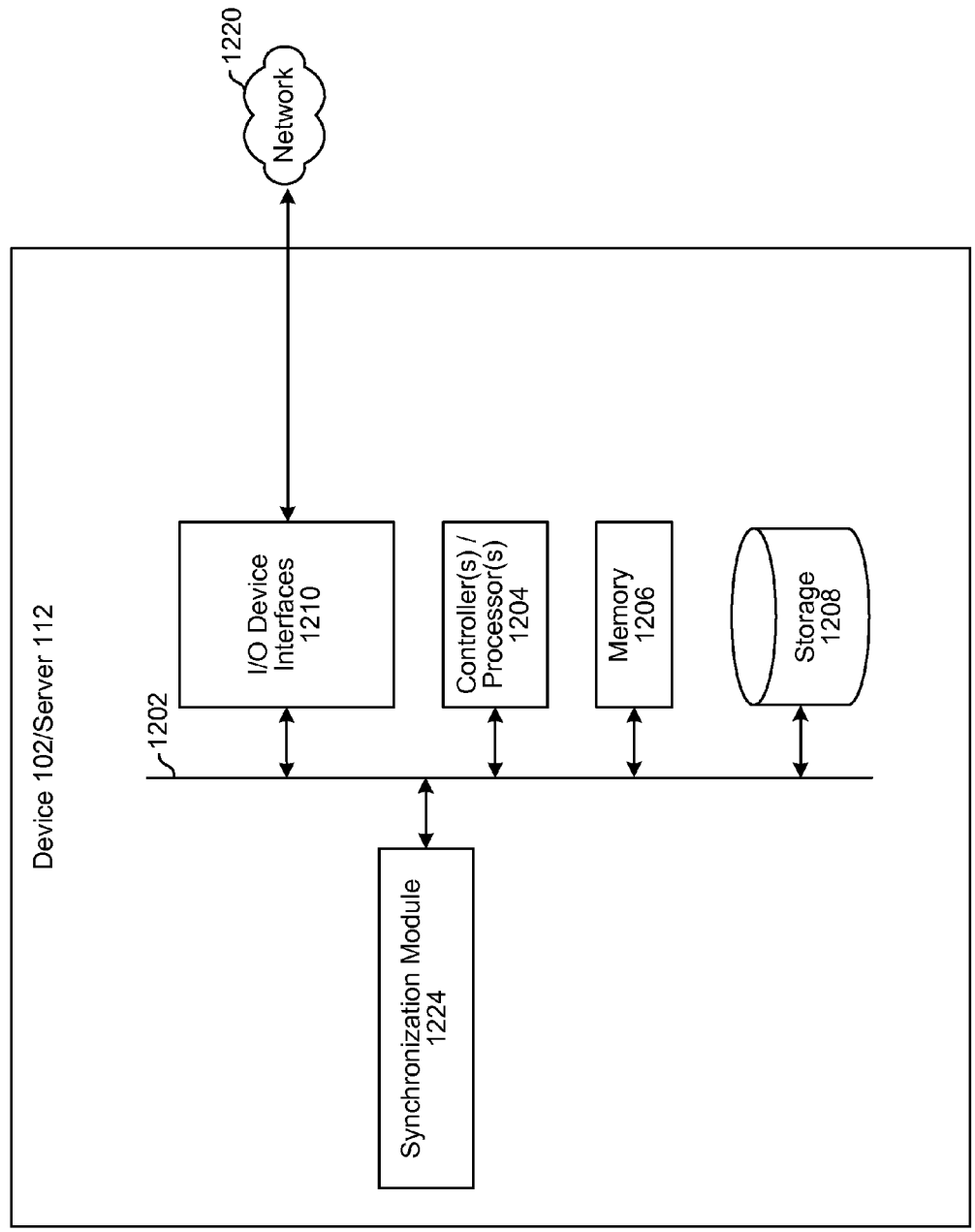
FIG. 12 is a block diagram conceptually illustrating example components of a system according to embodiments of the present disclosure.

FIG. 12 illustrates a block diagram conceptually illustrating example components of a system 100 including one or more of a device 102 and a server 112. Depending upon how the system is structured, some of the components illustrated in FIG. 12 as part of the device 102 or the server 112 may be included only in the device 102 or in the server 112, or may be distributed across multiple devices 102 and/or servers 112. Other components not illustrated may also be included in the device 102 and/or the server 112. In operation, the system 100 may include computer-readable and computer-executable instructions that reside in storage 1208 on the device 102/server 112. The device 102/server 112 may be an electronic device capable of performing facial recognition and/or speaker recognition. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server 112 may also be a component of any of the abovementioned devices or systems.

As illustrated in FIG. 12, the device 102/server 112 may include an address/data bus 1202 for conveying data among components of the device 102. Each component within the device 102/server 112 may also be directly connected to other components in addition to (or instead of) being connected to other components across the bus 1202.

The device 102/server 112 may include one or more controllers/processors 1204 comprising one-or-more central processing units (CPUs) for processing data and computer-readable instructions and a memory 1206 for storing data and instructions. The memory 1206 may include volatile random access memory (RAM), non-volatile read only memory (ROM), non-volatile magnetoresistive (MRAM) and/or other types of memory. The device 102/server 112 may also include a data storage component 1208 for storing data and processor-executable instructions. The data storage component 1208 may include one or more non-volatile storage types such as magnetic storage, optical storage, solid-state storage, etc. The device 102/server 112 may also be connected to a removable or external non-volatile memory and/or storage (such as a removable memory card, memory key drive, networked storage, etc.) through the input/output device interfaces 1210.

The device 102/server 112 includes input/output device interfaces 1210. A variety of components may be connected to the device 102/server 112 through the input/output device interfaces 1210, such as camera(s) and microphone(s). However, the disclosure is not limited thereto and the device 102/server 112 may not include an integrated camera or microphone. Thus, the camera(s), microphone(s) and/or other components may be integrated into the device 102 or may be separate without departing from the disclosure.

The input/output device interfaces 1210 may be configured to operate with a network 1220, for example a wireless local area network (WLAN) (such as WiFi), Bluetooth®, ZigBee® and/or wireless networks, such as a Long Term Evolution (LTE) network, WiMAX™ network, 3G network, etc. The network 1220 may include a local or private network or may include a wide network such as the internet. Devices may be connected to the network 1220 through either wired or wireless connections.

The input/output device interfaces 1210 may also include an interface for an external peripheral device connection such as universal serial bus (USB), FireWire, Thunderbolt, Ethernet port or other connection protocol that may connect to networks 1220. The input/output device interfaces 1210 may also include a connection to an antenna (not shown) to connect one or more networks 1220 via a wireless local area network (WLAN) (such as WiFi) radio, Bluetooth®, and/or wireless network radio, such as a radio capable of communication with a wireless communication network such as a Long Term Evolution (LTE) network, WiMAX™ network, 3G network, etc.

The device 102/server 112 further includes a synchronization module 1224, which may comprise processor-executable instructions stored in storage 1208 to be executed by controller(s)/processor(s) 1204 (e.g., software, firmware), hardware, or some combination thereof. For example, components of the synchronization module 1224 may be part of a software application running in the foreground and/or background on the device 102/server 112. The synchronization module 1224 may control the device 102/server 112 as discussed above, for example with regard to FIGS. 1, 9, 10A-10C and/or 11A-11B. Some or all of the controllers/ modules of the synchronization module 1224 may be executable instructions that may be embedded in hardware or firmware in addition to, or instead of, software. In one embodiment, the device 102/server 112 may operate using an Android® operating system (such as Android® 4.3 Jelly Bean, Android® 4.4 KitKat or the like), an Amazon® operating system (such as FireOS or the like), or any other suitable operating system.

Executable computer instructions for operating the device 102/server 112 and its various components may be executed by the controller(s)/processor(s) 1204, using the memory 1206 as temporary "working" storage at runtime. The executable instructions may be stored in a non-transitory manner in non-volatile memory 1206, storage 1208, or an external device. Alternatively, some or all of the executable instructions may be embedded in hardware or firmware in addition to or instead of software.

The components of the device(s) 102/server 112, as illustrated in FIG. 12, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 13:
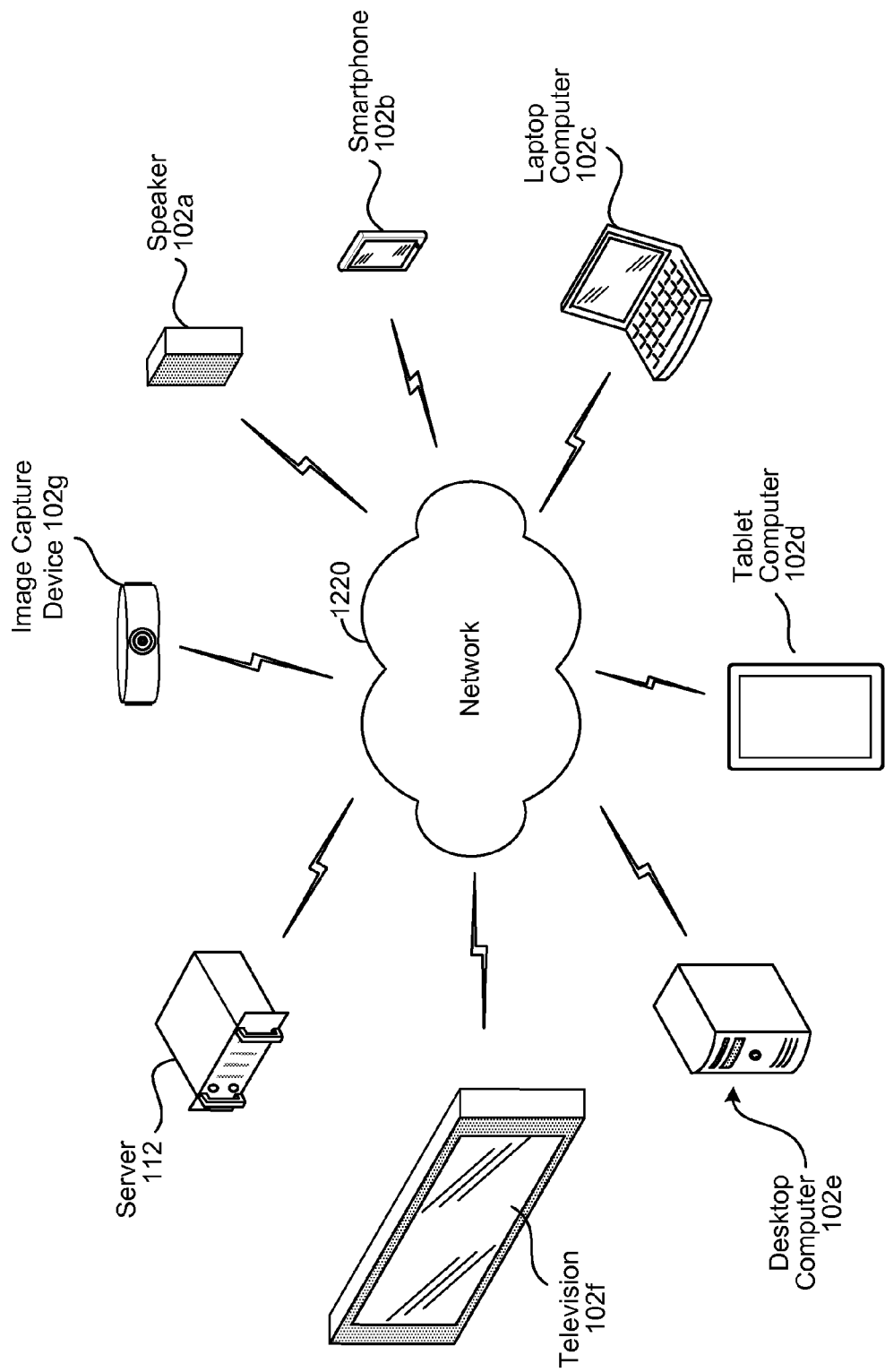
FIG. 13 illustrates an example of a computer network for use with the system.

As shown in FIG. 13, multiple devices may be connected over a network 1220. The network 1220 may include a local or private network or may include a wide network such as the internet. Devices may be connected to the network 1220 through either wired or wireless connections. For example, a smart phone 102b may be connected to the network 1220 through a wireless service provider and a speaker 102a may be connected to the network 1220 using a wireless connection (e.g., Bluetooth®, Wi-Fi or the like). Other devices, such as laptop computer 102c, tablet computer 102d, desktop computer 102e, television 102f, image capture device 102g and/or server 112, may connect to the network 1220 through a wired connection. The server 112 may be configured to receive, store, process and/or stream data related to image data, audio data and/or time synchronization data associated with one or more of the speaker 102a, smartphone 102b, laptop computer 102c, tablet computer 102d, desktop computer 102e, television 102f, image capture device 102g, etc. For example, the server 112 may perform any of the steps described above with regard to FIGS. 1, 6, and/or 9A-9C. Alternatively, the server 112 may receive and store data generated by the speaker 102a, smartphone 102b, laptop computer 102c, tablet computer 102d, desktop computer 102e, television 102f, image capture device 102g, etc. using any of the steps described above. Thus, the sever 112 may process and output audio data, image data video data and/or time synchronization data to allow convenient access to any of the devices connected to the server 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for synchronizing wireless devices into a network using oscillator circuitry of the devices, the method performed by a first image capture device, and the method comprising:
    operating a first counter on the first image capture device, the operating based on electrical signals received from first oscillator circuitry of the first image capture device, the first counter configured to store a natural number corresponding to a number of electrical signals received by the first counter;
    receiving a first beacon signal including a first value from a second image capture device, the first value corresponding to output data of a second counter on the second image capture device associated with a first time, the second counter configured to store a natural number and incrementing based on electrical signals received from second oscillator circuitry of the second image capture device;
    determining a second value corresponding to output data of the first counter associated with the first time;
    determining a first difference between the first value and the second value;
    receiving a second beacon signal including a third value from the second image capture device, the third value corresponding to output data of the second counter associated with a second time;
    determining a fourth value corresponding to output data of the first counter associated with the second time;
    determining a second difference between the third value and the fourth value;
    determining a drift by subtracting the first difference from the second difference;
    determining a fifth value using the fourth value and the drift, such that a third difference between the second value and the fifth value is equal to a fourth difference between the first value and the third value, wherein an absolute value of a fifth difference between the fifth value and the third value is greater than zero;
    storing the fifth value to the first counter;
    synchronizing a timing of a process running on the first device using the first counter.

2. The computer-implemented method of claim 1, further comprising:
    determining, prior to receiving the first beacon signal, that the first image capture device is not synchronized with a first source device;
    receiving a third beacon signal from the second image capture device, the receiving the third beacon including:
        receiving a first identification associated with the second image capture device,
        receiving a first source identification associated with the first source device, and
        receiving a first number of links in a first path, the first path being between the second image capture device and the first source device;
    determining a second number of links in a second path between the first image capture device and the first source device by incrementing the first number by one;
    storing the second number as a current number of links; and
    storing the first identification associated with the second image capture device.

3. The computer-implemented method of claim 2, further comprising:
    receiving a fourth beacon signal from a third image capture device, the fourth beacon signal including a second identification associated with the third image capture device, the first source identification and a third number of links in a third path from the third image capture device to the first source device;
    determining a fourth number of links in a fourth path between the first image capture device and the first source device by incrementing the third number by one;
    determining that the fourth number is less than the second number;
    storing the second identification associated with the third image capture device; and
    storing the fourth number as the current number of links.

4. The computer-implemented method of claim 1, further comprising:
    receiving first video data from the first image capture device;
    receiving second video data from the second image capture device;
    determining a sixth value associated with a first video frame from the first video data, the sixth value corresponding to output data of the first counter associated with a third time;
    determining a seventh value associated with a second video frame from the second video data, the seventh value corresponding to output data of the second counter associated with the third time;
    determining that the sixth value is equal to the seventh value; and
    synchronizing the first video data and the second video data, wherein the synchronizing synchronizes the first video frame with the second video frame.

5. A computer-implemented method, comprising, by a first device:
    storing, by the first device, a first identification associated with a second device;
    determining a first value associated with the first device and with a first time;
    receiving a first beacon signal from a second device;
    determining, based at least in part on the first beacon signal, a second value associated with the second device;
    determining the second value is associated with the first time;
    receiving a number of signals from first oscillator circuitry of the first device between the first time and a second time;
    determining a third value associated with the first device and with the second time, the determining based at least in part on the first value and the received number of signals;
    receiving a second beacon signal from the second device;
    determining, based at least in part on the second beacon signal, a fourth value associated with the second device;
    determining the fourth value is associated with the second time;
    determining a duration between the first time and the second time;
    determining a drift using the first value, the second value, the third value and the fourth value, the drift representing a variation between a first difference between the first value and the third value and a second difference between the second value and the fourth value;
    generating a fifth value using the third value and the drift, such that a third difference between the first value and the fifth value is equal to the second difference, wherein an absolute value of a fourth difference between the fifth value and the fourth value is greater than zero; and synchronizing a timing of a process running on the first device with the fifth value.

6. The computer-implemented method of claim 5, wherein the connecting further comprises:

determining that the first device is not synchronized with a source device;

receiving a third beacon signal from the second device, the receiving the third beacon signal including:
  receiving a first identification associated with the second device;
  receiving a source identification associated with the source device; and
  receiving a first number of links in a first path between the second device and the source device, a first link of the links corresponding to beacon signals sent from the source device to the second image capture device or an intervening device;

storing the source identification;

determining a second number of links in a second path between the first device and the source device by incrementing the first number by one;

storing the second number as a current number of links; and storing the first identification.

7. The computer-implemented method of claim 6, further comprising:

receiving a fourth beacon signal from a third device, the receiving the fourth beacon signal including:
  receiving a second identification associated with the third image capture device;
  receiving the source identification; and
  receiving a third number of links in a third path from the third device to the source device;

determining a fourth number of links in a fourth path between the first device and the source device by incrementing the third number by one;

determining that the fourth number is less than the second number;

storing the fourth number as the current number of links; and storing the second identification.

8. The computer-implemented method of claim 6, further comprising:

receiving a fourth beacon signal from a third device;

determining that the fourth beacon signal includes a second source identification different than the source identification; and determining not to store second identification associated with the third device.

9. The computer-implemented method of claim 6, further comprising:

determining a duration of time has passed since receiving the fourth value;

receiving a fourth beacon signal from a third device, the receiving the fourth beacon signal including:
  receiving a second identification associated with the third device;
  receiving a second source identification associated with a second source device, the second source identification different than the source identification; and
  receiving a third number of links in a third path between the third device and the second source device;

storing the second source identification;

determining a fourth number of links in a fourth path between the first device and the second source device by incrementing the third number by one;

storing the fourth number as a current number of links; and storing the second identification associated with the third device.

10. The computer-implemented method of claim 5, wherein determining the third value further comprises:

receiving a signal from the first oscillator circuitry, the first oscillator circuitry comprising a 32.768 kHz crystal oscillator; and determining the number of signals received from the first oscillator circuitry between the first time and the second time; and summing the first value and the number of signals received.

11. The computer-implemented method of claim 5, wherein the receiving the first beacon signal further comprises:

receiving a source identification associated with a source device;

receiving an identification associated with the second device;

receiving a first number of links in a first path between the second device and the source device; and receiving the second value.

12. The computer-implemented method of claim 5, wherein the first device is included in an ad-hoc network comprising a source device and the second device.

13. The computer-implemented method of claim 5, further comprising:

receiving a second number of signals from the first oscillator circuitry between the second time and a third time;

determining a sixth value associated with the first device and with the third time, the determining based at least in part on the fifth value and the second number of signals;

receiving a third beacon signal from the second device;

determining, based at least in part on the third beacon signal, a seventh value associated with the second device;

determining the seventh value is associated with the third time;

determining a second drift using the fourth value, the fifth value, the sixth value and the seventh value, the second drift representing a variation between a fifth difference between the fifth value and the sixth value and a sixth difference between the fourth value and the seventh value; and generating an eighth value using the sixth value and the second drift, such that a seventh difference between the fifth value and the eighth value is equal to the sixth difference, wherein an eighth difference between the eighth value and the seventh value is equal to the fourth difference.

14. A system, comprising:

a device including at least one processor;

a memory device including instructions operable to be executed by the at least one processor to configure the device to perform:
  storing, by the first device, a first identification associated with a second device;
  determining a first value associated with the first device and with a first time;
  receiving a first beacon signal from a second device;

determining, based at least in part on the first beacon signal, a second value associated with the second device;

determining the second value is associated with the first time;

receiving a number of signals from first oscillator circuitry of the first device between the first time and a second time;

determining a third value associated with the first device and with the second time, the determining based at least in part on the first value and the received number of signals;

receiving a second beacon signal from the second device;

determining, based at least in part on the second beacon signal, a fourth value associated with the second device;

determining the fourth value is associated with the second time;

determining a duration between the first time and the second time;

determining a drift using the first value, the second value, the third value and the fourth value, the drift representing a variation between a first difference between the first value and the third value and a second difference between the second value and the fourth value;

generating a fifth value using the third value and the drift, such that a third difference between the first value and the fifth value is equal to the second difference, wherein an absolute value of a fourth difference between the fifth value and the fourth value is greater than zero; and synchronizing a timing of a process running on the first device with the fifth value.

15. The system of claim 14, wherein the instructions further configure the system for:

determining that the first device is not synchronized with a source device;

receiving a third beacon signal from the second device, the receiving the third beacon signal including:
  receiving a first identification associated with the second device;
  receiving a source identification associated with the source device; and
  receiving a first number of links in a first path between the second device and the source device, a first link of the links corresponding to beacon signals sent from the source device to the second image capture device or an intervening device;

storing the source identification;

determining a second number of links in a second path between the first device and the source device by incrementing the first number by one;

storing the second number as a current number of links; and storing the first identification.

16. The system of claim 15, wherein the instructions further configure the system for:

receiving a fourth beacon signal from a third device, the receiving the fourth beacon signal including:
  receiving a second identification associated with the third image capture device;
  receiving the source identification; and
  receiving a third number of links in a third path from the third device to the source device;

determining a fourth number of links in a fourth path between the first device and the source device by incrementing the third number by one;

determining that the fourth number is less than the third number;

storing the fourth number as the current number of links; and storing the second identification.

17. The system of claim 15, wherein the instructions further configure the system for:

receiving a fourth beacon signal from a third device;

determining that the fourth beacon signal includes a second source identification different than the source identification; and determining not to store second identification associated with the third device.

18. The system of claim 15, wherein the instructions further configure the system for:

determining a duration of time has passed since receiving the fourth value;

receiving a fourth beacon signal from a third device, the receiving the fourth beacon signal including:
  receiving a second identification associated with the third device,
  receiving a second source identification associated with a second source device, the second source identification different than the source identification, and
  receiving a third number of links in a third path between the third device and the source device;

storing the second source identification;

determining a fourth number of links in a fourth path between the first device and the second source device by incrementing the third number by one;

storing the fourth number as a current number of links; and storing the second identification associated with the third device.

19. The system of claim 14, wherein the instructions further configure the system for:

receiving a signal from the first oscillator circuitry, the first oscillator circuitry comprising a 32.768 kHz crystal oscillator;

determining the number of signals received from the first oscillator circuitry between the first time and the second time; and summing the first value and the number of signals received.

20. The system of claim 14, wherein the instructions further configure the system for:

receiving the first beacon signal from the second device, the receiving the first beacon signal including:
  receiving a source identification associated with a source device;
  receiving an identification associated with the second device;
  receiving a first number of links in a first path between the second device and the source device; and
  receiving the second value.

21. The system of claim 14, wherein the first device is included in an ad-hoc network comprising a source device and the second device.

22. The system of claim 14, wherein the instructions further configure the system for:

receiving a second number of signals from the first oscillator circuitry between the second time and a third time;

determining a sixth value associated with the first device and with the third time, the determining based at least in part on the fifth value and the second number of signals;

receiving a third beacon signal from the second device;

determining, based at least in part on the third beacon signal, a seventh value associated with the second device;

determining the seventh value is associated with the third time;

determining a second drift using the fourth value, the fifth value, the sixth value and the seventh value, the second drift representing a variation between a fifth difference between the fifth value and the sixth value and a sixth difference between the fourth value and the seventh value; and generating an eighth value using the sixth value and the second drift, such that a seventh difference between the fifth value and the eighth value is equal to the sixth difference, wherein an eighth difference between the eighth value and the seventh value is equal to the fourth difference.

* * * * *